US012162305B2

(12) United States Patent
Nakajima

(10) Patent No.: US 12,162,305 B2
(45) Date of Patent: Dec. 10, 2024

(54) KNOCK-TYPE WRITING INSTRUMENT

(71) Applicant: MITSUBISHI PENCIL COMPANY, LIMITED, Shinagawa-ku (JP)

(72) Inventor: Toru Nakajima, Shinagawa-ku (JP)

(73) Assignee: MITSUBISHI PENCIL COMPANY, LIMITED, Shinagawa-ku (JP)

( * ) Notice: Subject to any disclaimer, the term of this patent is extended or adjusted under 35 U.S.C. 154(b) by 0 days.

(21) Appl. No.: 18/005,908

(22) PCT Filed: Jul. 15, 2021

(86) PCT No.: PCT/JP2021/026625
§ 371 (c)(1),
(2) Date: Jan. 18, 2023

(87) PCT Pub. No.: WO2022/019208
PCT Pub. Date: Jan. 27, 2022

(65) Prior Publication Data

US 2023/0347683 A1 Nov. 2, 2023

(30) Foreign Application Priority Data

Jul. 20, 2020 (JP) ................................ 2020-123622

(51) Int. Cl.
*B43K 24/08* (2006.01)
*B43K 8/12* (2006.01)
*B43K 8/24* (2006.01)

(52) U.S. Cl.
CPC .............. *B43K 24/084* (2013.01); *B43K 8/12* (2013.01); *B43K 8/24* (2013.01)

(58) Field of Classification Search
CPC ................................. B43K 8/028; B43K 8/24
See application file for complete search history.

(56) References Cited

U.S. PATENT DOCUMENTS 3,039,436 A * 6/1962 Exner ...................... B43K 8/24 401/174
4,469,462 A 9/1984 Hashimoto et al.
(Continued)

FOREIGN PATENT DOCUMENTS

CN 1633370 A 6/2005
CN 101092093 A 12/2007
(Continued)

OTHER PUBLICATIONS

International Search Report issued on Sep. 21, 2021 in PCT/JP2021/026625 filed on Jul. 15, 2021, 3 pages.
(Continued)

*Primary Examiner* — David P Angwin
*Assistant Examiner* — Bradley S Oliver
(74) *Attorney, Agent, or Firm* — Oblon, McClelland, Maier & Neustadt, L.L.P.

(57) ABSTRACT

To provide a clicking type writing instrument capable of reliably suppressing volatilization of ink from the pen tip at least before the start of use. The clicking type writing instrument A has a refill 20 provided in a barrel cylinder 10; a pen tip 30 configured to discharge ink from an ink storage member 18 accommodated in the refill 20 by capillary action and to be allowed to be projected from and retracted into a front end of the barrel cylinder 10 by means of a clicking mechanism 70 provided in the barrel cylinder 10; and at least a seal member 40, arranged around an outer periphery of the pen tip 30 near a front end side of the pen tip, and formed with a through-hole 42 in a center of the seal member, through which the pen tip 30 can slidably move back and forth when the pen tip 30 is housed inside the barrel cylinder 10.

8 Claims, 20 Drawing Sheets

(56) References Cited

U.S. PATENT DOCUMENTS

| | | | | | |
|---|---|---|---|---|---|
| 4,911,570 | A * | 3/1990 | Rhoades | B43K 8/24 | |
| | | | | 401/117 | |
| 6,478,495 | B2 * | 11/2002 | Ami | B43K 5/17 | |
| | | | | 401/107 | |
| 2005/0084321 | A1 * | 4/2005 | Carroll | B43K 8/028 | |
| | | | | 401/107 | |
| 2007/0134047 | A1 | 6/2007 | Hu | | |
| 2008/0008517 | A1 * | 1/2008 | Wang | B43K 5/17 | |
| | | | | 401/107 | |
| 2008/0187389 | A1 | 8/2008 | Dylkiewicz et al. | | |
| 2023/0086315 | A1 * | 3/2023 | Kobayashi | B43K 8/08 | |
| | | | | 401/112 | |
| 2023/0211627 | A1 * | 7/2023 | Duffy | B43K 5/165 | |
| | | | | 401/99 | |

FOREIGN PATENT DOCUMENTS

| | | | |
|---|---|---|---|
| DE | 20 2018 002072 | U1 | 9/2019 |
| EP | 0 150 557 | A2 | 8/1985 |
| JP | 46-4971 | | 2/1971 |
| JP | 49-107421 | U1 | 9/1974 |
| JP | 58-72089 | U1 | 5/1983 |
| JP | 60-34486 | U1 | 3/1985 |
| JP | 1-281999 | A | 11/1989 |
| JP | 2-61687 | U1 | 5/1990 |
| JP | 2003-191683 | A | 7/2003 |
| JP | 2010-517815 | A | 5/2010 |
| JP | WO2010/100800 | A1 | 9/2012 |
| KR | 830 002943 | Y1 | 12/1983 |
| KR | 900 014403 | U | 8/1990 |
| WO | WO 2008/094376 | A1 | 8/2008 |

OTHER PUBLICATIONS

Chinese Office Action issued in Chinese Patent Application No. 202180063754 on Jun. 25, 2024.

European Search Report issued in European Patent Application No. 21845975.8 on Jul. 11, 2024.

* cited by examiner

KNOCK-TYPE WRITING INSTRUMENT

TECHNICAL FIELD

This specification relates to at least a clicking type writing instrument that can minimize volatilization of ink from the pen tip.

BACKGROUND ART

Conventionally, there are many known clicking type writing instruments that have an anti-dry structure for preventing volatilization of ink from the pen tip.

Examples include:

1) a packing device in a clicking type fountain pen, including an annular packing made of rubber or soft synthetic resin attached to the constricted portion of a writing body movably inserted in the barrel cylinder in such a manner as to be in pressure contact with the peripheral surface of the constricted portion of the writing body and with the inner wall of the necked sleeve and move along the constricted portion of the writing body while rolling thereon as the writing body moves (see, for example, Patent Document 1);
2) a retractable writing instrument including a writing body that can be projected from and retracted into a barrel cylinder, and a seal lid that seals the writing part of the writing body in conjunction with the back and forth movement of the writing body, wherein the seal lid and the writing body are coupled by a thread-like member, and the pen tip is prevented from drying by a sealing unit [designated at 4 in the drawing (surface sealing, designated at 4*f*)] in addition to the integral structure of the seal lid and the thread-like member (see, for example, Patent Document 2);
3) a writing instrument including a mechanism for opening and closing the pen tip, which allows the pen tip to project for writing when actuating an operating member provided for the barrel cylinder of the writing instrument and which enables the pen tip to automatically retract into the barrel cylinder when releasing the operating member, and also having an O-ring (designated at 17 in the drawing) inside the barrel cylinder to further enhance prevention of drying of the pen tip (see, for example, Patent Document 3); and
4) a capless writing instrument equipped with an anti-dry mechanism, which includes a seal chamber as a space for accommodating a tip writing part provided inside the body of the writing instrument, a seal lid pivotable on its one end for sealing the front of the seal chamber, a sealing means for sealing the rear part behind an air hole of the writing body in the sealing chamber when accommodating, and a coupling means connected at its one end to the seal lid and at the other end to a linkage member that receives a retracting force from the spring, and is configured to enable the writing body to move forward and backward inside the writing instrument body so that the tip writing part can come in and out of the front end of the writing instrument body (for example, see Patent Document 4).

However, all of the clicking type writing instruments and the like of Patent Documents 1 to 4 include a sealing means that uses an O-ring or the like on the pen tip side in addition to a sealing mechanism that prevents the pen tip from drying out by enabling the pen tip to project and retract with a seal lid or the like. In this way, the structures are complicated and expensive with problems such as awkward design. Further, there is no mechanism to reliably prevent volatilization of ink from the pen tip before use. Thus, there is a strong demand for a clicking type writing instrument that can further improve the prevention of drying from the pen tip.

PRIOR ART DOCUMENTS

Patent Documents

Patent Document 1

Japanese Examined Utility Model Publication No. SHO 46-4971 (Scope of claim of utility model registration, FIG. 1, etc.)

Patent Document 2

Japanese Unexamined Patent Application Publication No. 2003-191683 (claims, FIGS. 1 and 3)

Patent Document 3

International Publication No. 2010/100800 (Scope of claims of Patent, FIGS. 1, 10, etc.)

Patent Document 4

Japanese Unexamined Patent Application publication No. HEI 1-281999 (Scope of claims of Patent, FIG. 1, etc.)

SUMMARY OF THE INVENTION

Problems to be Solved by the Invention

The present disclosure aims to solve the above-described problems of the prior art, it is an object to provide a clicking type writing instrument that can reliably suppress volatilization of ink from the pen tip before the start of use and also provide a clicking type writing instrument having a structure capable of suppressing volatilization of ink from the pen tip as much as possible even after the start of use.

Means for Solving the Problems

The inventor hereof intensively studies to solve the above-mentioned conventional problems, and resultantly has found a clicking type writing instrument satisfying the above object, thereby completing the present disclosure, by providing a clicking type writing instrument comprising a refill provided in a barrel cylinder; a pen tip configured to discharge ink from an ink storage member accommodated in the refill by capillary action and to be allowed to be projected from and retracted into the front end of the barrel cylinder by an operation of a clicking mechanism provided in the barrel cylinder; and a specific configuration, arranged around an outer periphery of the pen tip near a front end side of the pen tip, and formed with a through-hole in a center of the seal member, through which the pen tip becomes slidable back and forth when the pen tip is housed inside the barrel cylinder.

Specifically, a clicking type writing instrument of the present disclosure comprises a refill provided in a barrel cylinder; a pen tip configured to discharge ink from an ink storage member accommodated in the refill by capillary action and to be allowed to be projected from and retracted into a front end of the barrel cylinder by means of a clicking mechanism provided in the barrel cylinder; and at least a seal member, arranged around an outer periphery of the pen tip near a front end side of the pen tip, and formed with a through-hole in a center of the seal member, through which the pen tip can slidably move back and forth when the pen tip is housed inside the barrel cylinder.

It is preferable that the seal member has a sealing piece that can be removed by pressing the pen tip, arranged in front of a front end of the pen tip.

It is preferable to provide a sealing mechanism that seals a circulation of air between a rear portion of the barrel cylinder and an outside of the writing instrument before use or when not clicked and allows air to flow to the outside of the writing instrument when clicked so as to keep internal and external pressures uniform to prevent ejection of ink from the pen tip when not clicked.

It is preferable that an anti-volatilization member that surrounds the outer peripheral of the pen tip is formed with a helical groove in a rear of the seal member.

It is preferable that a helical groove is formed on an inner surface of the seal member.

It is preferable that a tip-mouth member is provided in a rear of the pen tip of the refill, and a helical groove is formed on an outer peripheral surface of the tip-mouth member.

It is preferable that the barrel cylinder is formed with an interior wall against which a rear endface of the refill is abutted, and a groove is formed on a surface of the interior wall.

It is preferable that the pen tip of the refill is separated from the ink storage member by a projecting and retracting movement.

It is preferable to provide a clicking mechanism arranged on the rear portion of the barrel cylinder, the clicking mechanism allowing the refill to be projected and retracted by a pressing operation, wherein the clicking mechanism is comprised of a cam mechanism comprising an actuator and a rotor, and the rotor is equipped with a valve portion that is opened by an inner pressure acting on an inner surface of the barrel cylinder.

Advantages of the Invention

The present disclosure provides the clicking type writing instrument that can reliably suppress volatilization of ink from the pen tip before the start of use and also provides the clicking type writing instrument capable of suppressing volatilization of ink from the pen tip as much as possible even after the start of use.

The objects and advantages of the present disclosure may be realized and obtained by the configurations particularly specified in the claims and their combinations. Further, in the specification, both of the foregoing general description and the following detailed description herein are given for exemplary and explanatory purposes, and will not limit the disclosure claimed in the scope of claims.

MODE FOR CARRYING OUT THE INVENTION

Figure 1:
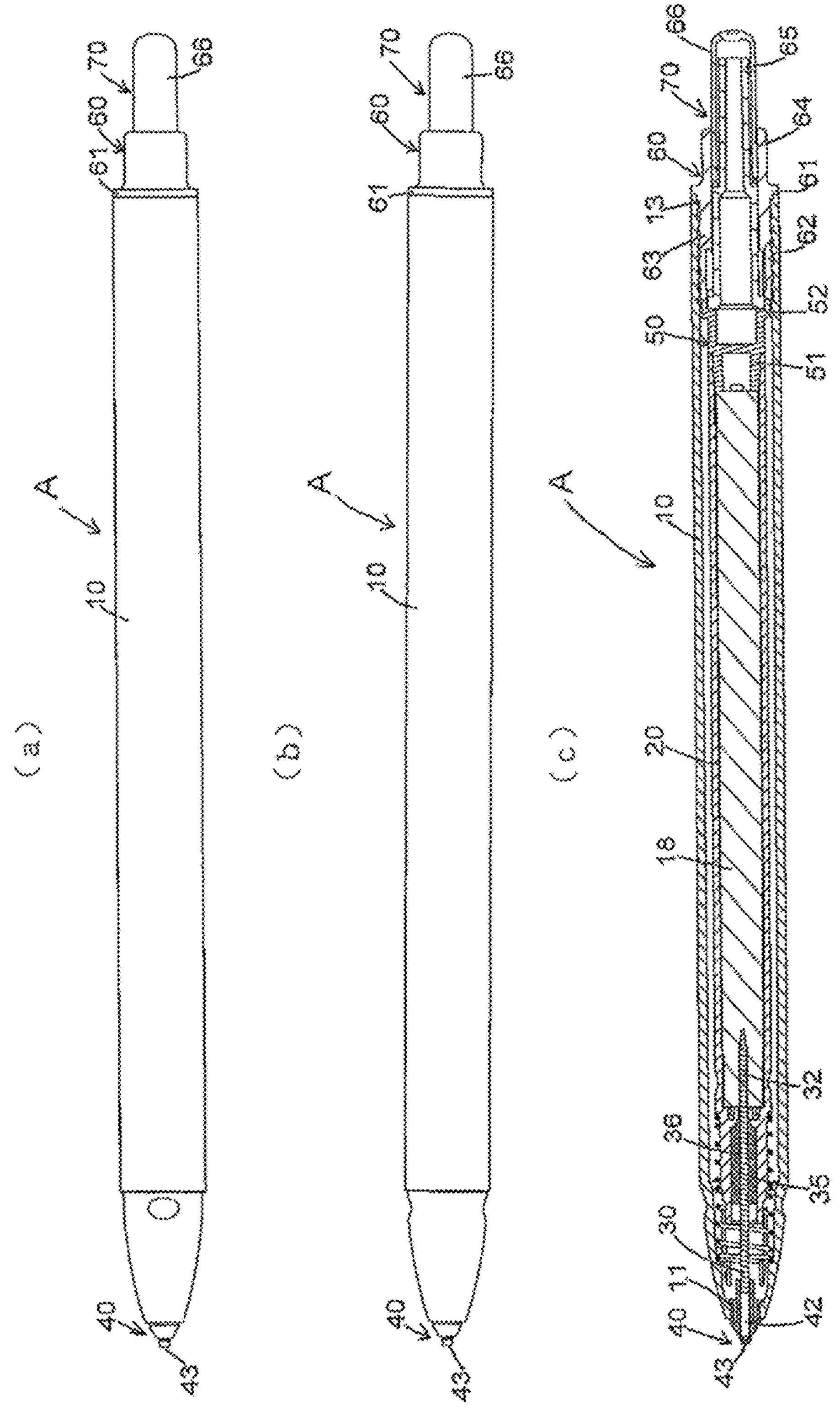
FIG. 1 is a drawing showing an unused state of a clicking type writing instrument according to a first embodiment of the present disclosure, (a) a plan view, (b) a front view, and (c) a longitudinal section in a front view.

Next, at least some embodiments of the present disclosure will be described in detail with reference to the drawings. However, it should be noted that the technical scope of the present disclosure is not limited to each embodiment described in detail below, but includes the inventions recited in the claims and equivalents thereof.

FIGS. 1 to 7 are drawings showing a clicking type writing instrument according to the first embodiment of the present disclosure and the like.

As shown in FIGS. 1 to 7, the clicking type writing instrument of the first embodiment at least includes a barrel cylinder 10 serving as a writing instrument main body; a refill 20 accommodating an ink storage member 18, provided in the barrel cylinder 10; a pen tip 30; a seal member 40; and a clicking mechanism 70. The pen tip 30 discharges ink from the ink storage member 18 by capillary action. The pen tip 30 is configured to be projected from and retracted into the front end of the barrel cylinder 10 by means of the clicking mechanism 70.

In this embodiment, as will be described later, at least the seal member 40 is provided around the periphery of the pen tip 30 near the front end side thereof, and is formed with a through-hole 42 in the center of the seal member 40, through which the pen tip 30 can slidably move back and forth when the pen tip 30 is housed inside the barrel cylinder 10.

The barrel cylinder 10, which serves as the body of the writing instrument, is made of, for example, polyacetal-based resin, polyethylene-based resin, acrylic-based resin, polyester-based resin, polyamide-based resin, polyurethane-based resin, polyolefin-based resin, polyvinyl-based resin, polycarbonate-based resin, polyether-based resin, polyphenylene resin, or other thermoplastic or thermosetting resins (hereinafter each of these resins will be simply referred to as "each resin"), and is tapered toward the front end with an opening 11 to which the seal member 40 is fixed while another opening 13 on the rear end side is attached with the clicking mechanism 70.

Provided inside the barrel cylinder 10 is the refill 20 accommodating the ink storage member 18.

The ink storage member 18 is impregnated with ink for writing instruments such as water-based ink, oil-based ink, and thermochromic ink, and may be formed of a bundle of fibers including, for example, natural fibers; animal hair fibers; fibers comprised of one or a combination of two or more of polyacetal-based resin, acrylic-based resin, polyester-based resin, polyamide-based resin, polyurethane-based resin, polyolefin-based resin, polyvinyl-based resin, polycarbonate-based resin, polyether-based resin, and polyphenylene-based resin; processed fiber bundles such as felt; and porous materials such as sponges, resin particles, and sintered bodies. The ink storage member 18 is configured to be accommodated in the refill 20.

The composition of the ink used for writing instruments is not particularly limited, and a suitable combination of water-based inks, oil-based inks and thermochromic inks can be used depending on the application of the writing instrument. For highlighters and the like, fluorescent dyes such as Basic Violet 11 and Basic Yellow 40 can be used, and thermochromic microcapsule pigments may be contained.

More preferably, formulating a composition of an ink for writing instruments containing at least water, a water-soluble organic solvent, a coloring agent and a glyceryl glycoside, makes it possible to produce an excellent effect in restraining the pen tip from drying, promote quick drying of the written ink surface without causing smudges even if rubbed, and prevent ink starvation even in a low temperature environment.

The glyceryl glycoside used includes α-glyceryl glycoside, which is formed by condensation of glycerol and glucose with α-links, and β-glyceryl glycoside, which is formed by condensation of glycerol and glucose with β-links, and may be either an enzyme reaction product obtained by reacting α-glucosidase on a mixture of malto-oligosaccharide and glycerol or a product obtained by a condensation reaction of glycerol and glucose. Glyceryl glycoside may include α-glyceryl glycoside and β-glyceryl glycoside, or α-glyceryl glycoside is more preferred as the glyceryl glycoside. Specific examples of α-glyceryl glycoside include α GG and α GG-L (manufactured by JST Corporation). The added amount of the glucosyl glycerols is preferably 0.5% by mass or greater and 30.0% by mass or lower relative to the total amount of the ink composition. Glyceryl glycoside may be used alone or two or more kinds of glyceryl glycosides may be used in combination.

The water that can be used for writing instrument ink includes tap water, groundwater, ion-exchanged water, pure water, and ultrapure water and the like, and is not particularly limited.

Dyes and pigments can be used as the coloring agent that can be used in the ink for writing instruments without any particular restrictions.

Water-soluble dyes can be used as dyes. Specific examples of water-soluble dyes include direct dyes, acid dyes, and basic dyes. These dyes may be used alone, or two or more dyes may be used in combination.

Specific examples of pigments include carbon blacks such as furnace black, contact black, thermal black, acetylene black; black iron oxide; yellow iron oxide; red iron oxide; ultramarine blue; Prussian blue; cobalt blue; titanium yellow; turquoise; molybdate orange; titanium oxide; gold powder; silver powder; copper powder; aluminum powder; brass powder; tin powder; mica pigment; C.I. Pigment Reds 2, 3, 5, 17, 22, 38, 41, 48:2, 48:3, 49, 50:1, 53:1, 57:1, 58:2, 60, 63:1, 63:2, 64:1, 88, 112, 122, 123, 144, 146, 149, 166, 168, 170, 176, 177, 178, 179, 180, 185, 190, 194, 206, 207, 209, 216, and 245; C.I. Pigment Oranges 5, 10, 13, 16, 36, 40, and 43; C.I. Pigment Violets 19, 23, 31, 33, 36, 38, and 50; C.I. Pigment Blues 2, 15, 15:1, 15:2, 15:3, 15:4, 15:5, 16, 17, 22, 25, 60, and 66; C. I. Pigment Browns 25 and 26; C. I. Pigment Yellows 1, 3, 12, 13, 24, 93, 94, 95, 97, 99, 108, 109, 110, 117, 120, 139, 153, 166, 167, and 173; C.I. Pigment Greens 7, 10, and 36; and the like. These pigments may be used alone, two or more kinds of pigments may be used in combination. Moreover, a pigment and a dye can be used in combination as a coloring agent.

When a pigment is used as a coloring agent, a dispersant can be used to stably disperse the pigment. As the dispersant, conventionally used water-soluble resins, water-soluble resins, anionic or nonionic surfactants, and the like, which are known to be used as dispersants for pigments, can be used. The added amounts of these water-soluble resins and surfactants are preferably 0.05% by mass or greater and 20.0% by mass or lower relative to 10.0% by weight of the pigment. These water-soluble resins and surfactants may be used alone, or two or more kinds of these water-soluble resins and surfactants can be used in combination.

A pigment dispersion in which a pigment is dispersed in an aqueous medium can also be used. Inorganic pigments, organic pigments, fluorescent pigments and the like can be used as pigment dispersions, and these may be used alone, or two or more kinds may be used in combination. However, when colored resin particles are used as a coloring agent, the resin particles that are insoluble in organic solvents should be used.

In addition to the coloring agents described above, colorless particles such as resin particles, wax particles, and resin emulsions can be used to adjust the shade. Among these, use of oxidized polyethylene wax particles can suppress unwanted transfer of ink to the back at the same time.

Regardless of coloring agents or colorless particles, setting the solid content concentration in the ink for writing instruments to 25% by mass or greater is preferable because unwanted transfer of ink to the back can be suppressed. In addition, use of oxidized polyethylene wax particles can suppress unwanted transfer of ink to the back even if the solid content concentration in the writing instrument ink is equal to or lower than 25% by mass. The content of oxidized polyethylene wax particles is, relative to the total amount of the ink composition, preferably 0.1% by mass or greater and 50.0% by mass or lower, more preferably 0.5% by mass or greater and 23.0% by mass or lower, and most preferably 1.0% by mass or greater and 15.0% by mass or lower.

The water-soluble organic solvent used for writing instrument ink refers to an organic solvent that can dissolve with 10 grams or more of the solvent in 100 grams of water. Among the water-soluble organic solvents, in terms of ink permeability into the paper and suppression of drying of the pen tip, glycol ethers and water-soluble organic solvents with cyclic structures are preferable, and water-soluble organic solvents having cyclic structures are more preferable. Moreover, among these water-soluble organic solvents, use of glycol ether and/or the water-soluble organic solvent having cyclic structures in combination with a polyhydric alcohol is more preferable to improve suppression of drying of the pen tip and ink permeability into paper, thanks to the mutual interaction between the glyceryl glycoside and the water-soluble organic solvent. The added amount of these water-soluble organic solvents is preferably 0.1% by mass or greater and 50.0% by mass or lower, more preferably 5.0% by mass or greater and 20.0% by mass or lower, relative to the total amount of the ink composition. These water-soluble organic solvents may be used alone, or two or more kinds of the water-soluble organic solvents may be used in combination.

The viscosity of the water-based ink for writing instruments is preferably 1.0 mPa·s or higher and 20.0 mPa·s or lower at a measurement temperature of 25° C. and a shear rate of 76.6 $s^{-1}$. Also, the surface tension is preferably 30 to 60 mN/m.

In addition to the above components, additives such as lubricants, viscosity modifiers, lubricants, preservatives, antifungal agents, antirust agents, antifoaming agents, and pH adjusters may be used in combination as required. These additives may be used alone, or two or more kinds may be used in combination.

In order to produce a water-based ink for writing instruments, one or more coloring agents selected from the above pigments and/or pigment dispersions and dyes; water and/or an organic solvent; and a dispersant are mixed and stirred sufficiently by a dispersing machine such as a homomixer. Then, other additives such as a viscosity modifiers, pH modifiers, dyes for color tone adjustment, lubricants, etc. are blended and dissolved further until uniform. In some cases, the mixed ink may be further dispersed by a disperser, or the obtained ink may be filtered or centrifuged to remove coarse particles and insoluble components.

Figure 3:
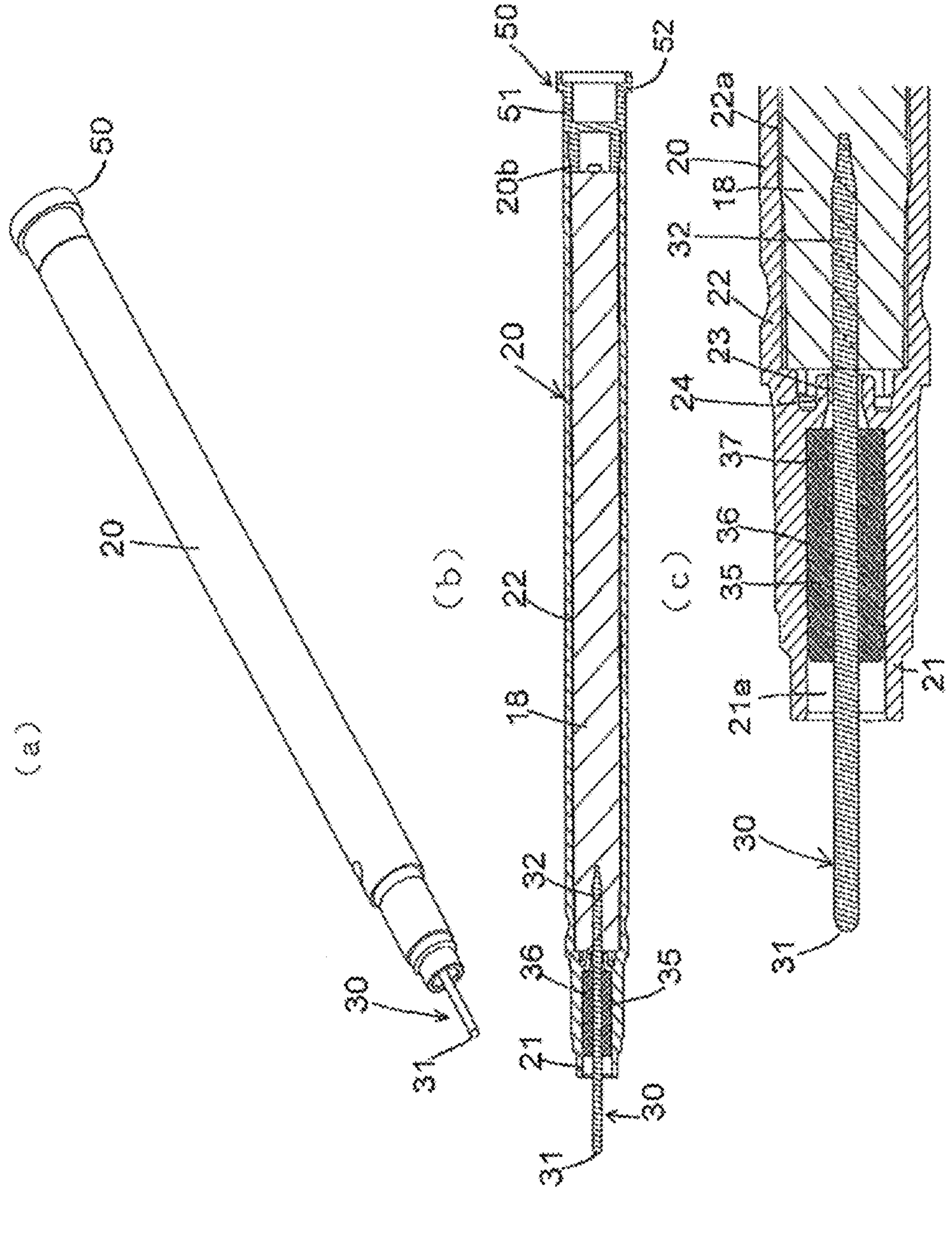
FIG. 3 is a drawing showing an example of a refill to which a pen tip used for the clicking type writing instrument according to the first embodiment of the present disclosure is fixed, (a) a perspective view, (b) a longitudinal section in a front view, (c) a partially enlarged longitudinal section of essential parts.

As shown in FIGS. 3(*a*) to 3(*c*), in the refill 20 an anti-volatilization member 35 surrounding the pen tip 30 is fixed by fitting inside a storage space 21*a* of a small-diametric tubular portion 21 on the front side of the refill. The ink absorbent 18 is accommodated in a storage space 22*a* of a large-diametric tubular portion 22 which is larger in diameter than the tubular portion 21, and connected on the rear side of the tubular portion 21. Further, there is a holder 24 having a holding hole 23 for holding the rear side of the pen tip 30 between the small-diametric tubular portion 21 and the enlarged tubular portion 22. The refill including these tubular portions 21, 22 and the like can be integrally molded with resin or the like.

Figure 4:
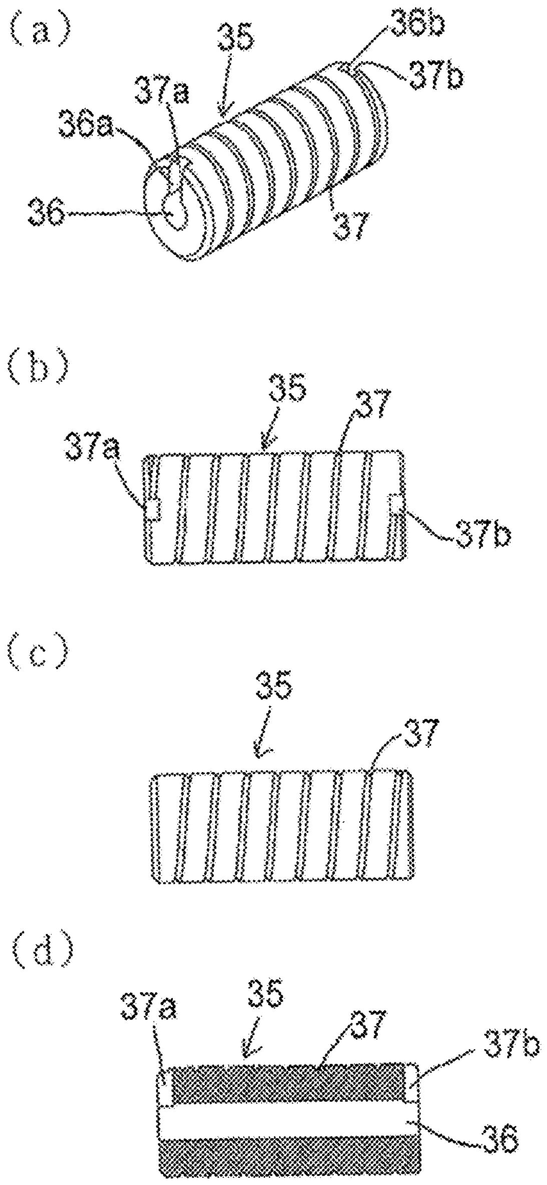
FIG. 4 is a part drawing of an anti-volatilization member fixed in the refill of FIG. 3, (a) a perspective view, (b) a plan view, (c) a front view, and (d) a longitudinal section.
Figure 5:
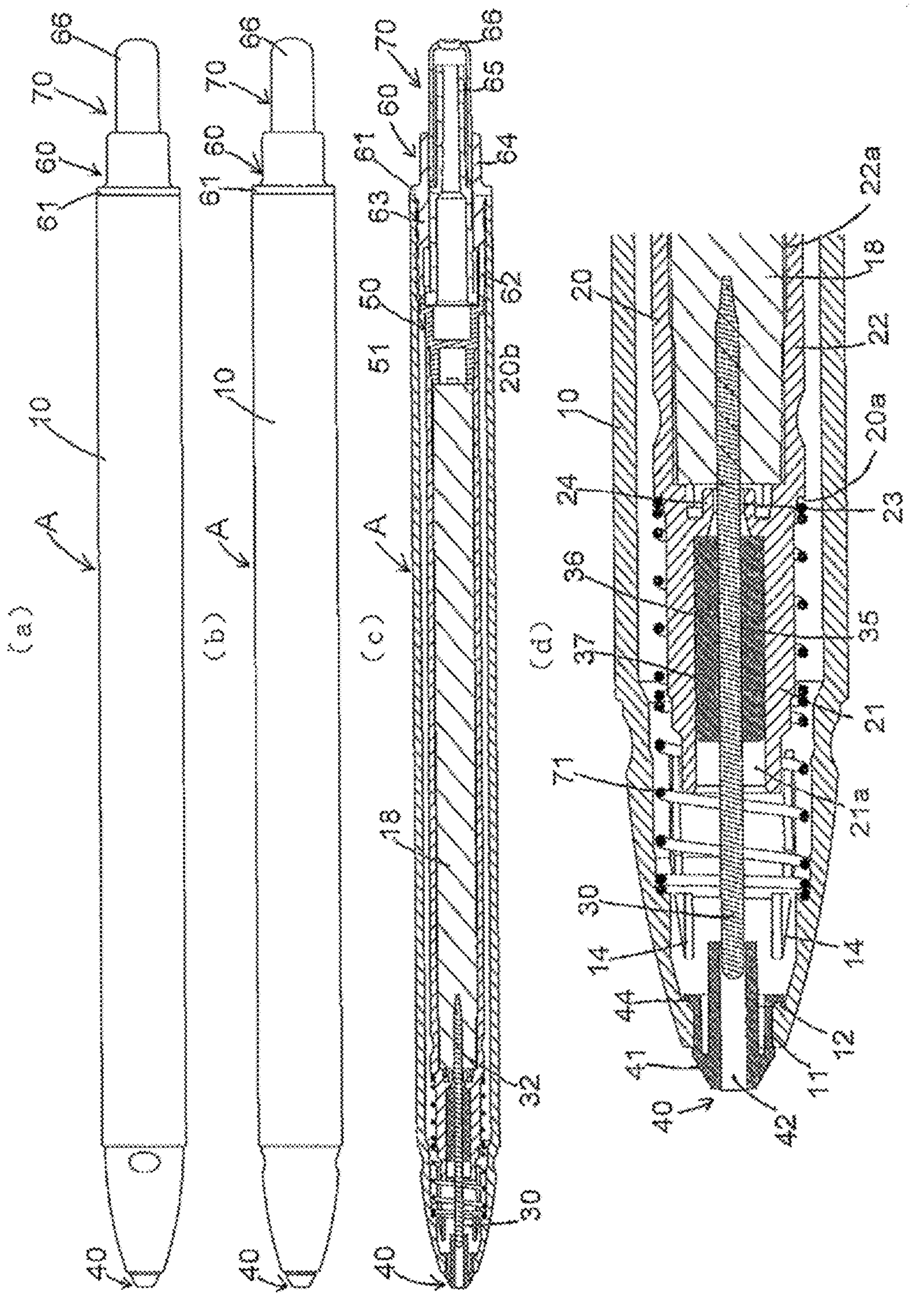
FIG. 5 is a drawing showing a state of the clicking type writing instrument of FIG. 1 after use in non-clicked mode, (a) a plan view, (b) a front view, (c) a longitudinal section in a front view, and (d) a partially enlarged longitudinal section of a pen tip portion.

As shown in FIGS. 4(*a*) to 4(*d*), the anti-volatilization member 35 of a cylindrical shape has a through fixing hole 36 for fixing the pen tip 30 therein and a helical groove 37 formed helically on the outer surface of the anti-volatilization member from one end to the other end of the anti-volatilization member. The ends 37*a* and 37*b* of the helical groove are connected to respective cutout portions 36*a* and 36*b* at the ends of the fixing hole 36. The groove shape of the helical groove 37 may have, for example, a V-shaped or U-shaped cross-section. The length of the helical groove is preferably set to be more than twice the longitudinal dimension (linear length) of the anti-volatilization member 35 in order to make it difficult for the ink to volatilize. Further, volatilization of ink can be highly suppressed by specifying the groove shape, width, length, etc. of the helical groove 37 within suitable ranges.

As shown in FIGS. 3(*a*) to 3(*c*), the pen tip 30 of the present embodiment is formed bar-like with a writing part 31 on the tip side thereof. This pen tip 30 is fixed in the middle part to the fixing hole 36 of the anti-volatilization member 35 while the rear end, designated at 32, of the pen tip 30 is inserted into the center of the ink storage member 18 on the front side, so that the ink occluded in the ink storage member 18 is efficiently drawn (fed) to the writing part 31 of the pen tip 30 by capillary force (capillary action).

This pen tip 30 is made of a porous member, which is a fiber core, a porous body (sintered core), or an extrusion molded core obtained by extrusion molding. The fiber core is obtained by processing or resin-processing a parallel fiber bundle or a fiber bundle of felt or the like, the parallel fiber bundle being made of one or a combination of two or more of fibers including, for example, natural fibers, animal hair fibers, polyacetal-based resin, polyethylene-based resin, acrylic-based resin, polyester-based resin, polyamide-based resin, polyurethane-based resin, polyolefin-based resin, polyvinyl-based resin, polycarbonate-based resin, polyether-based resin, and polyphenylene-based resin. The porous body (sintered core) is obtained by sintering a plastic powder of thermoplastic resin such as polyolefin-based resin, acrylic-based resin, polyester-based resin, polyamide-based resin, polyurethane-based resin, etc.

Preferred items of the pen tip 30 include fiber bundle cores, fiber cores, sintered cores, felt cores, sponge cores, inorganic porous cores, and the like. These items may be covered on their peripheral side with a resin film or the like to form a coated fiber core. The porosity, size, hardness, etc. of the pen tip 30 to be used vary depending on the type of ink, the type of writing instrument, etc. For example, the porosity is preferably 30 to 60%. Further, in the present disclosure, "porosity" is calculated as follows. First, the writing core having a known mass and apparent volume is dipped in water, and sufficiently saturated with water, and then the mass is measured in a state of being taken out from the water. From the measured mass, the volume of water soaked up in the writing core is derived. Assuming the volume of water as the pore volume of the writing core, the porosity can be calculated from the following formula:

Porosity(unit:%)=(water volume)/(apparent volume of the pen tip 30)×100.

Figure 2:
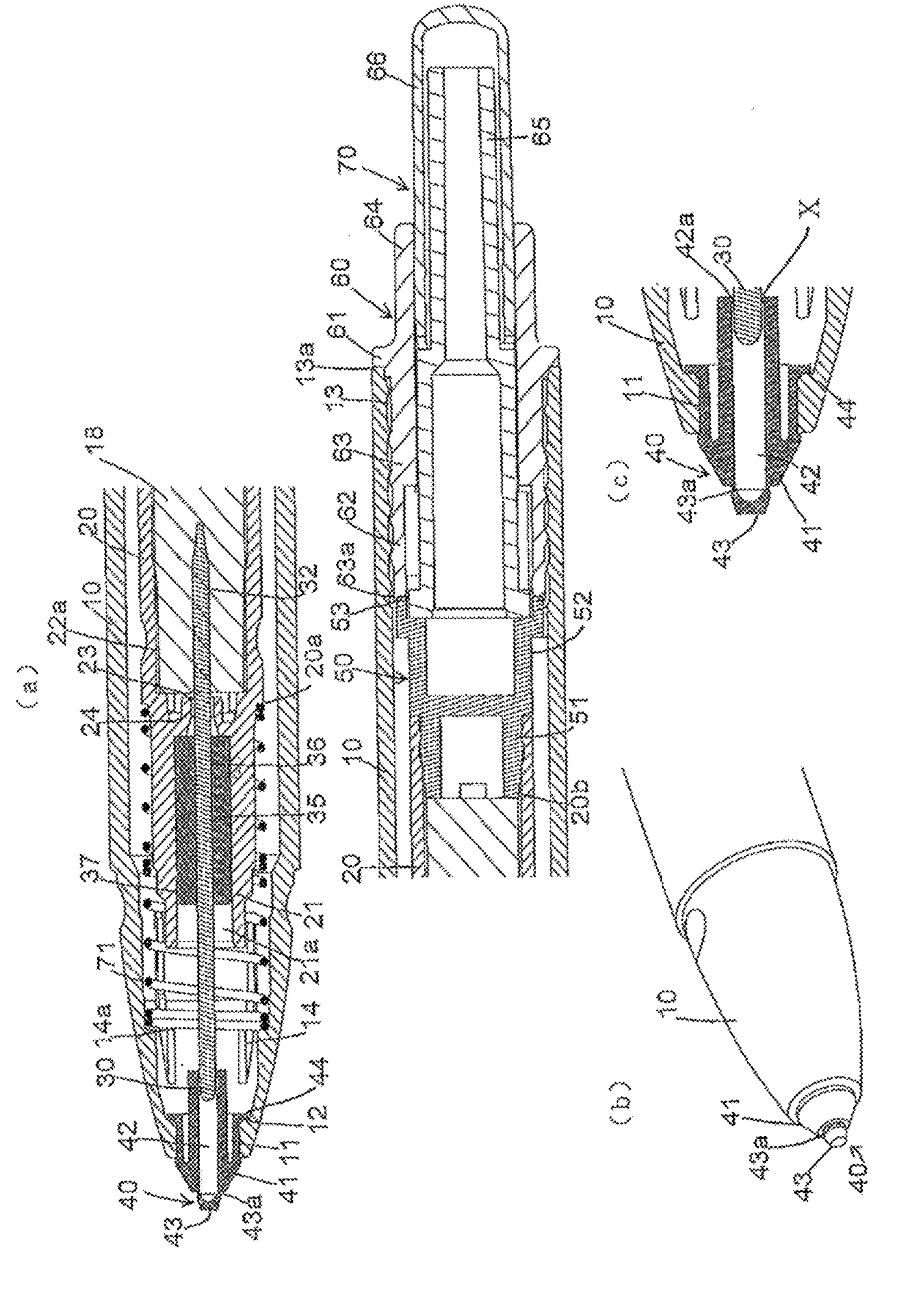
FIG. 2 is a drawing showing, (a) a partial enlarged longitudinal section showing divided essential parts of the clicking type writing instrument of FIG. 1, (b) a partial enlarged perspective view of a seal member, and (c) a partial enlarged longitudinal section of (b).

As shown in FIGS. 2(*a*) to 2(*c*), the seal member 40 is fixed to the tapered opening 11 at the tip of the barrel cylinder 10 by engaging, fitting or the like. The seal member 40 has the through-hole 42 formed in the center of a main body 41 enabling the pen tip 30 to slide back and forth therethrough, and also has a sealing piece 43 that is arranged in front of the pen tip 30 and integrated on the outer circumference of the front end of the through-hole 42 so that it can be removed at least by pressing the pen tip 30 or with fingers, and the like. An engaging part 44 having elasticity for fixture to a circumferential engaging portion 12 of the opening 11 is continuously extended around the through-hole 42.

The sealing piece 43 is provided integrally to shut the exit of the through-hole 42, and is formed, for example, with a thin skin-like (ultra-thin) connecting portion 43*a* so that the sealing piece can be easily removed by the thrust of the pen tip 30 by a clicking operation, which will be described later, or by fingers or the like, while the seal member 40 including the connecting portion 43*a* and the sealing piece 43 is configured to be able to prevent volatilization of ink from the pen tip 30 before removal. The sealing piece 43 can be easily removed from the main body 41 of the seal member 40 by cutting the circumferential connecting portion 43*a* with the thrust of the pen tip 30 or fingers or the like. For the material of the seal member 40, from the viewpoint of satisfying sealing function and ease of removal, in addition to the above resins, thermoplastic elastomers such as styrene elastomer, vinyl chloride elastomer, olefin elastomer, polyester elastomer, polyamide elastomer and polyurethane elastomer (each of the above elastomers is hereinafter simply referred to as "each thermoplastic elastomer") as well as synthetic rubbers such as nitrile butadiene rubber (NBR), silicone rubber, ethylene propylene rubber (EPDM), fluorosilicone rubber, fluororubber, urethane rubber, natural rubber, chloroprene rubber, butadiene rubber and butyl rubber (each of the above synthetic rubbers is hereinafter referred to as "each synthetic rubber") can be preferably used. Further, the seal member 40 and the barrel cylinder 10 may be integrally formed by two-color molding (for example, two-color molding of each resin and each thermoplastic elastomer described above).

In this embodiment, though the pen tip 30 can slide back and forth in the through-hole 42 of the seal member 40 by the click operation, a small gap X is formed between a peripheral edge 42*a* at the rear edge of the through-hole 42 and the peripheral edge of the pen tip 30 to suppress the evaporation of the ink and to perform efficient air replacement (to keep the internal and external pressures uniform). Specifically, the gap X is specified co be 0.02 to 1.0 mm, and is 0.05 mm in the present embodiment [see FIG. 2(*c*)].

Attached by fitting to an opening 20*b* on the rear end side of the refill 20 is a lid member 50 for sealing the opening. This lid member 50 has a fitting body 51 for sealing the opening 20*b* and a tubular flange portion 52.

Figure 6:
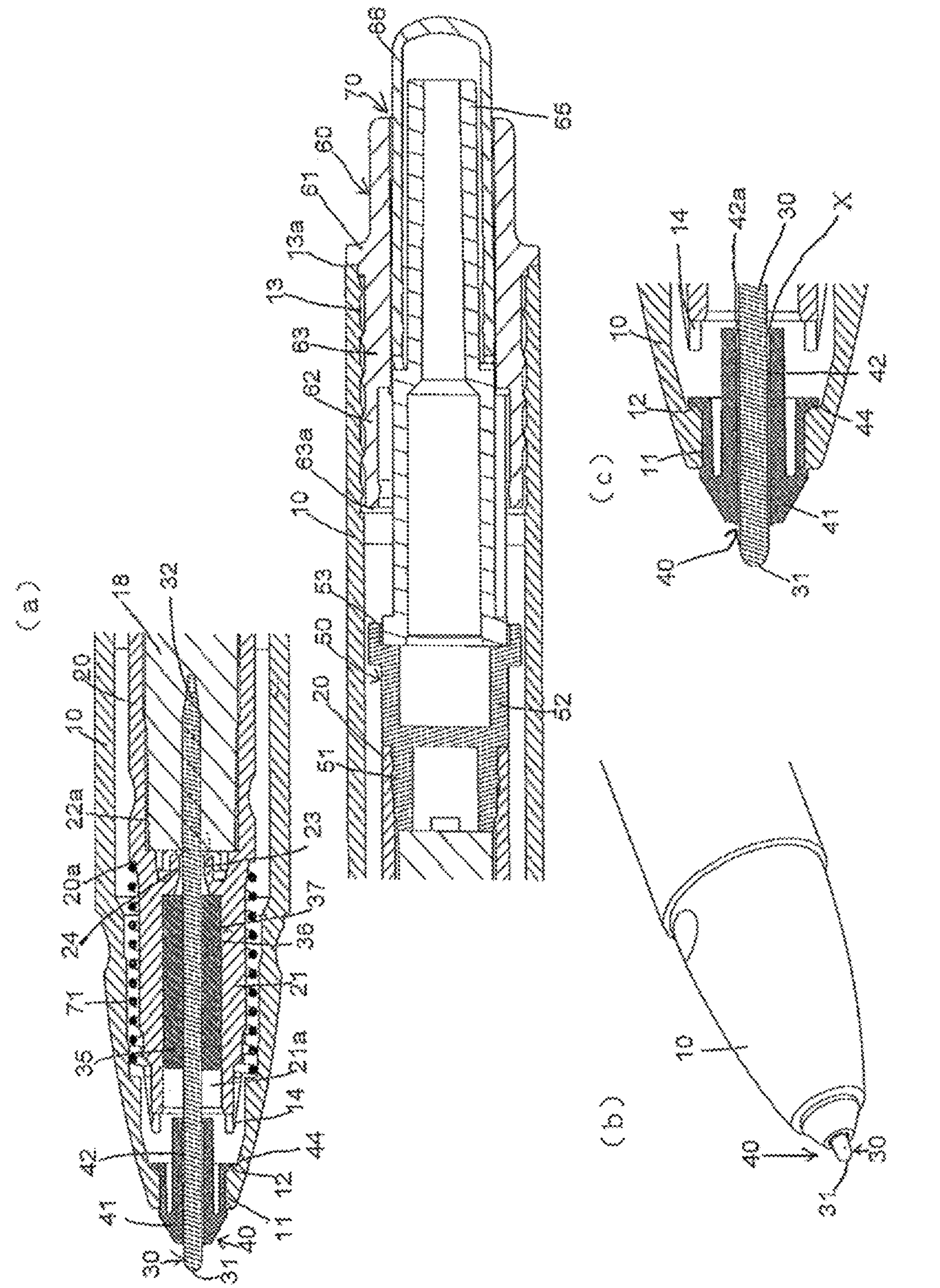
FIG. 6 is a drawing showing a state in which the pen tip is projected after removing a sealing piece by clicking the clicking type writing instrument of FIG. 1, (a) a partially enlarged longitudinal section shown with essential parts divided, (b) a partially enlarged perspective view of the pen tip portion, and (c) a partially enlarged longitudinal section of (b).
Figure 7:
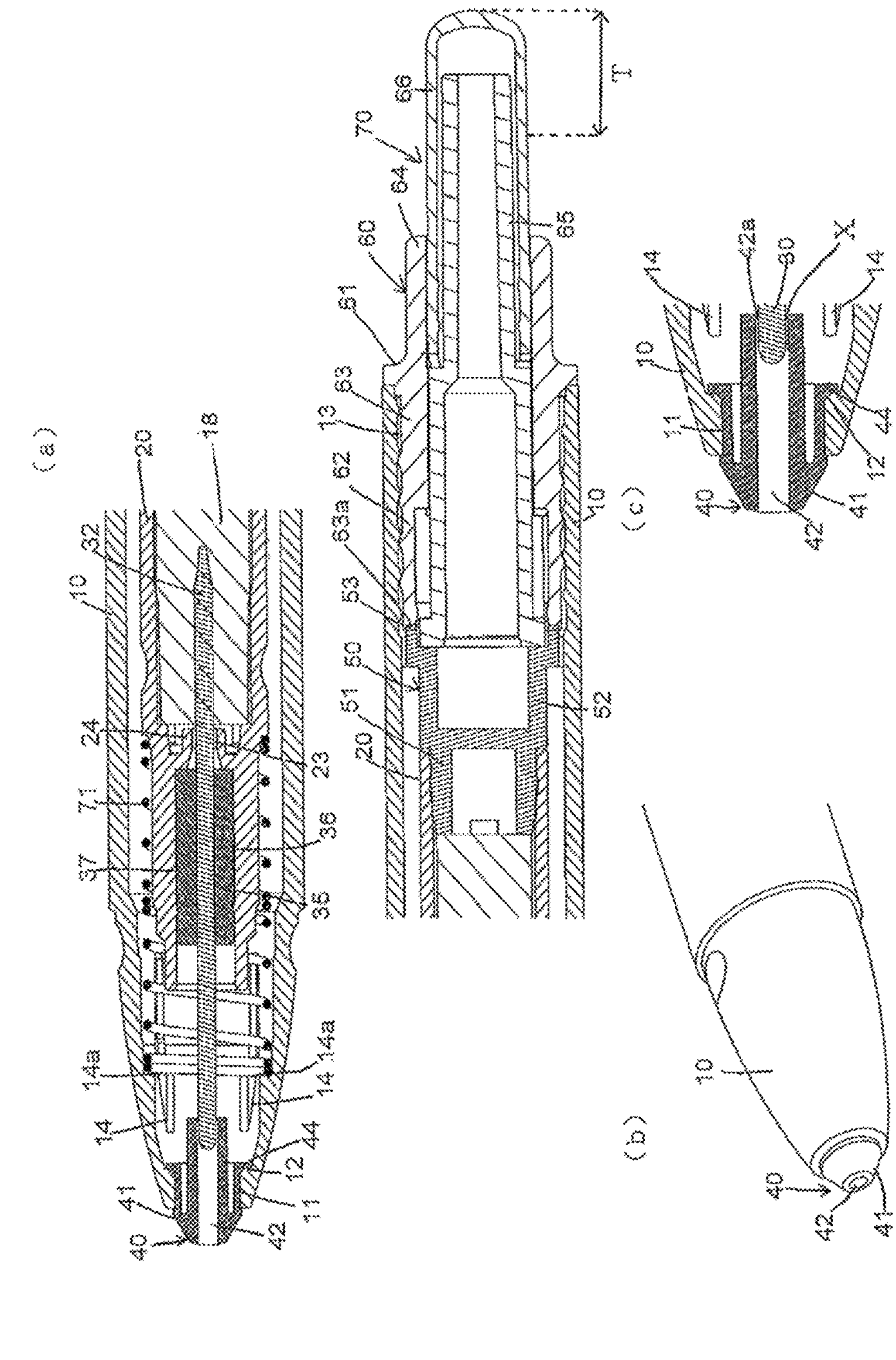
FIG. 7 is a drawing, (a) a partially enlarged longitudinal section shown with essential parts divided, showing a state in which the pen tip of the clicking type writing instrument of FIG. 6 was projected by clicking and then clicked again to return the pen tip into the barrel cylinder, (b) a partially enlarged perspective view of the pen tip portion, and (c) a partially enlarged longitudinal section of (b).

As shown in FIGS. 2, 6 and 7, the clicking mechanism 70 of this embodiment includes an inner sleeve 60 attached to the rear end opening 13 of the barrel cylinder 10 by screwing, a rotor 65 arranged so as to be movable in the front-rear direction inside the inner sleeve 60, and a clicking body 66 serving as an actuator which protrudes from the rear end inside the inner sleeve 60 and is movable in the front-rear direction. As shown in FIG. 2(*a*), the inner sleeve 60 includes a flange portion 61 that closely contacts and seals an L-shaped abutment surface 13*a* of the rear end opening 13 of the barrel cylinder 10, an inner sleeve portion 63 having a thread portion 62 on an outer peripheral surface on the front side of the flange portion 61, and an outer sleeve portion 64 on the rear side of the flange portion 61. Further, the front endface 63*a* of the inner sleeve portion 63 is configured to closely contact and seal the contact surface 53 of the flange portion 52 of the lid member 50 that seals the opening portion 20*b* on the rear end side of the refill 20. In order to further improve the sealing performance (hermeticity) between the contact surfaces that serve as the endfaces, the lid member 50 and the inner sleeve 60 may be preferably made by use of the aforementioned each resin, the aforementioned each thermoplastic elastomer, and aforementioned above each synthetic rubber.

The clicking mechanism 70 of the present embodiment enables the refill 20 to project and retract by a pressing operation, and has a publicly known mechanism (rotating cam mechanism) including the clicking body 66 serving as an actuator, the rotor 65 and an outer cam (not shown) provided on the inner peripheral portion of the inner sleeve 60. This clicking mechanism together with the refill 20 is urged rearward by an elastic member 71 consisting of a coil spring held between holding pieces 14, 14 . . . and hold steps 14*a*, 14*a* . . . , which are formed in the vertical direction at predetermined intervals on the inner circumferential surface in the front part of the barrel cylinder 10, and a mounting step 20*a* formed around the outer circumference on the front side of the refill 20. The clicking operation is performed by pressing the clicking body 66 forward. As the clicking operation is performed, the rotor 65 is pushed forward by the movement of the clicking body 66, and the rotor 65 and the front endface of the outer cam (not shown) of the inner sleeve 60 are locked so that the refill 20 is moved forward and the pen tip 30 fixed to the anti-volatilization member 35 in the refill 20 comes out from the exit of the through-hole 42 of the seal member 40 to establish a writing state (see FIG. 6). When the clicking operation is performed again after writing, the locked state is released and the refill 20 moves rearward so that the pen tip 30 returns to its original position, and the like (see FIG. 7, etc.).

Furthermore, in the present embodiment, the clicking mechanism 70 preferably has a stroke T of 2.0 to 15.0 mm, as shown in FIG. 7(*a*). Specifying the stroke within the above range makes it possible to suppress volatilization while making the clicking mechanism 70 efficient.

The clicking type writing instrument A thus configured, is designed so that the sealing piece 43 of the seal member 40 can be removed when the clicking operation is done for the first time (an initial clicking operation). That is, as shown in FIGS. 1 and 2, volatilization of ink before use, from the pen tip 30 on the tip side of the barrel cylinder 10 is reliably suppressed by the seal member 40 including the sealing piece 43. As described above, the sealing piece 43 can be detached when the pen tip 30 is pressed (creating a writing state by the clicking operation) or by being torn off with fingers or the like, so that the sealed state can be easily released, thus establishing the writing state by this release (see FIG. 6). Since only the pen tip 30 is exposed in the front end of the barrel cylinder 10 after the initial clicking operation, the amount of volatilization of ink from the pen tip 30 can be suppressed.

Further provided in the rear portion of the barrel cylinder 10 in this embodiment, together with the above-described embodiment, or as an independent embodiment, is a sealing mechanism that seals the communication of air between the rear portion of the barrel cylinder 10 and the outside of the writing instrument before use or when not clicked and allows air to flow to the outside of the writing instrument when clicked to keep internal and external pressures uniform, thereby preventing ejection of ink from the pen tip 30 when not clicked. That is, in the sealing mechanism of this embodiment, volatilization of ink from the pen tip 30 is suppressed by the sealing piece 43 of the seal member 40 before use. Further, as shown in FIG. 2(*a*), when unused (including a state when not clicked) the rear end side of the barrel cylinder 10 is sealed by hermetic contact between the flange portion 61 of the inner sleeve 60 and the abutment surface 13*a* of the rear end opening 13 while the front endface 63*a* of the inner sleeve 63 and the rear end contact surface 53 of the lid member 50 are sealed by being brought into hermetic contact with each other, so that volatilization of ink from the rear end of the barrel cylinder 10 is also suppressed. Further, when the clicking operation is performed from the unused state or non-clicked state, air is taken in, as shown in FIG. 6(*c*), through a clearance X between the pen tip 30 and the seal member 40 and the taken air passes through the space (gap) between the barrel cylinder 10 and the refill 20 and the gap between the inner sleeve 63 and the rotor 65 and is discharged out of the writing instrument so that the internal and external pressures become uniform, whereby it is possible to prevent ink ejection from the pen tip 30 due to an increase of the internal pressure in the barrel cylinder 10.

Furthermore, in the above-described embodiment, when the anti-volatilization member 35 is arranged in the rearward of the seal member 40, is fixed in the storage space 21*a* of the refill 20, and surrounds the outer circumference of the pen tip 30 and the outer circumference of the anti-volatilization member 35 is formed with the helical groove 37 having a helical configuration as described above and shown in FIGS. 3 and 4, ink from the ink storage member 18 in the refill 20 will volatilize through the helical groove 37 of a helical configuration, so that the route of volatilization becomes longer than a linear way (groove) so that it is possible to suppress volatilization of ink from the refill 20 itself. Thus, according to the clicking type writing instrument of the present embodiment, provision of the seal member 40 having the sealing piece 43 and the helical groove 37 having the helical configuration on the anti-volatilization member 35 makes it possible to provide a clicking type writing instrument that can highly suppress volatilization of ink from the pen tip before use.

FIGS. 8 to 20 are drawings showing other embodiments of the clicking type writing instruments of the present disclosure. When each of the embodiments below has the same configurations and functions as the writing instrument A of the above first embodiment, the same reference numerals are attached to each of the drawings etc., in each of the following embodiments without description.

Figure 8:
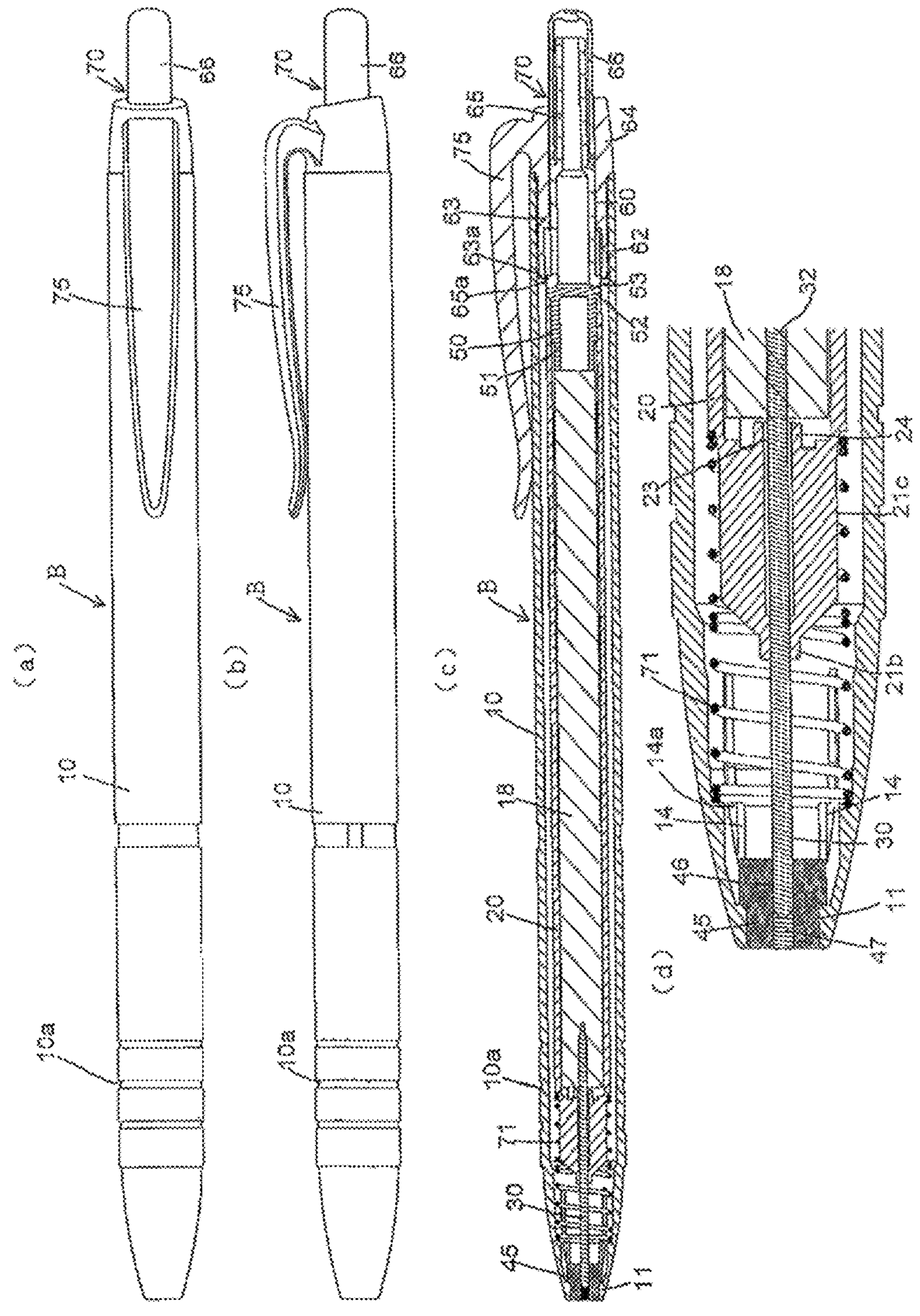
FIG. 8 is a drawing showing an unused state of a clicking type writing instrument according to a second embodiment of the present disclosure, (a) a plan view, (b) a front view, (c) a longitudinal section in a front view, and (d) a partially enlarged longitudinal section of a pen tip portion.
Figure 9:
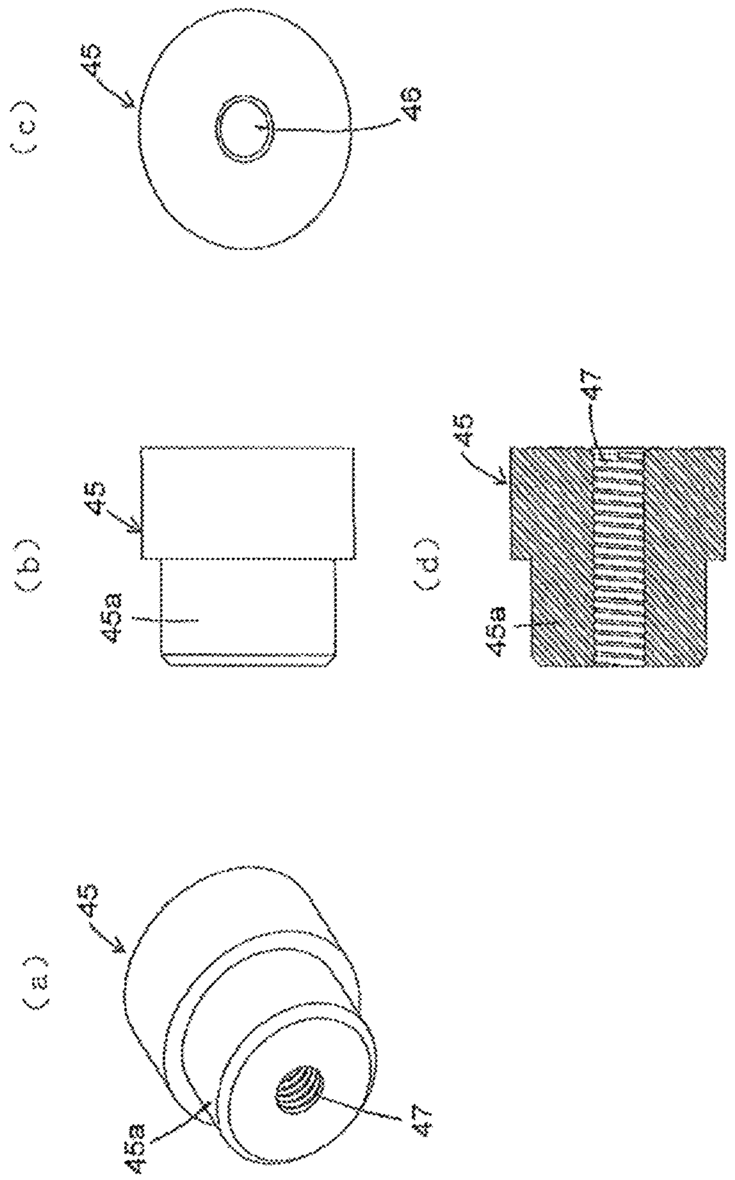
FIG. 9 is a drawing of a seal member used in the clicking type writing instrument according to the second embodiment of the present disclosure, (a) a perspective view seen from the left side, (b) a front view, (c) a right side view, and (d) a longitudinal section in a front view.
Figure 10:
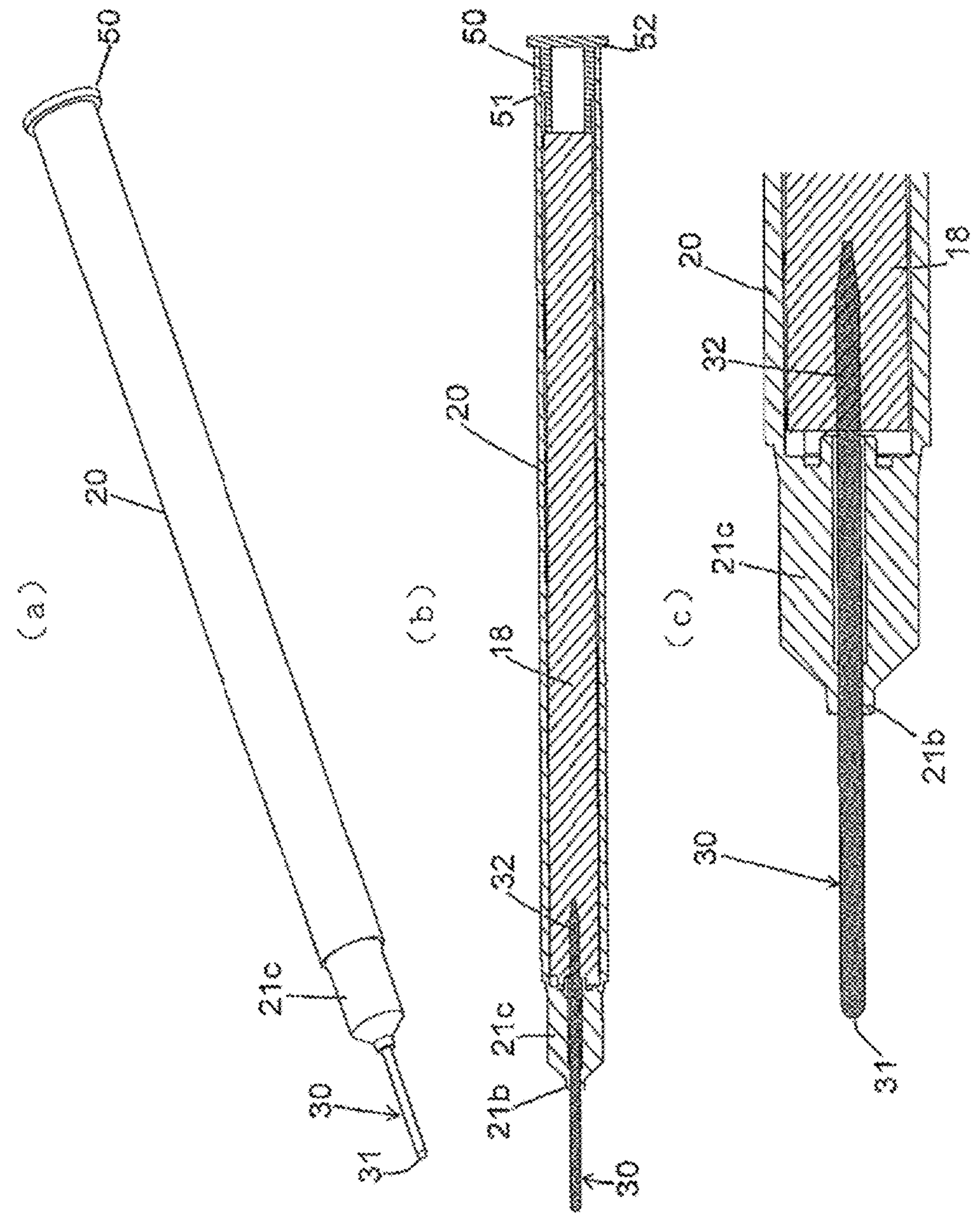
FIG. 10 is a drawing showing an example of a refill to which a pen tip used for the clicking type writing instrument of FIG. 8 is fixed, (a) a perspective view, (b) a longitudinal section in a front view, (c) a partially enlarged longitudinal section of essential parts.
Figure 11:
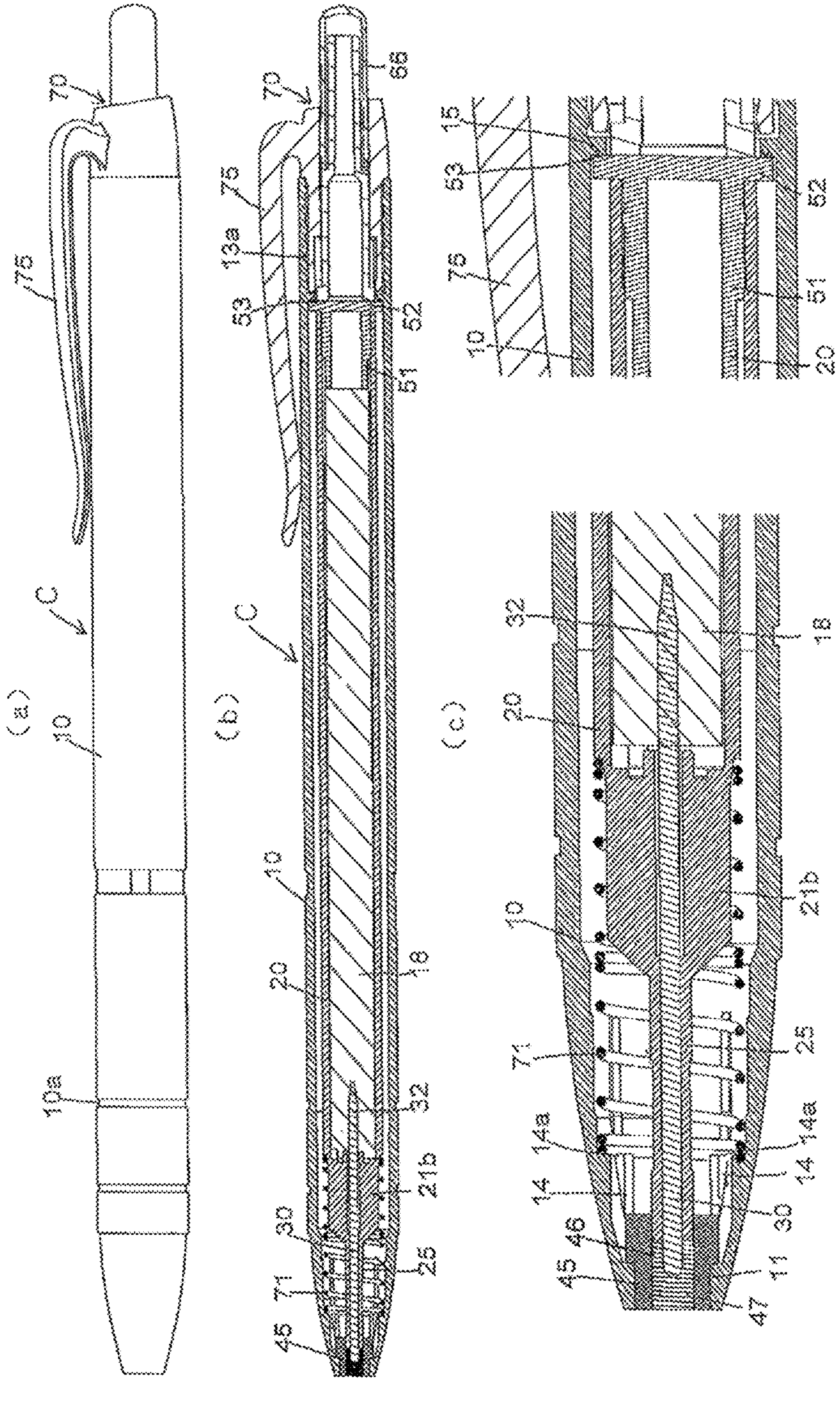
FIG. 11 is a drawing showing a clicking type writing instrument according to a third embodiment of the present disclosure, (a) a front view, (b) a longitudinal section in the front view, (c) a partially enlarged longitudinal section shown with essential parts divided.
Figure 12:
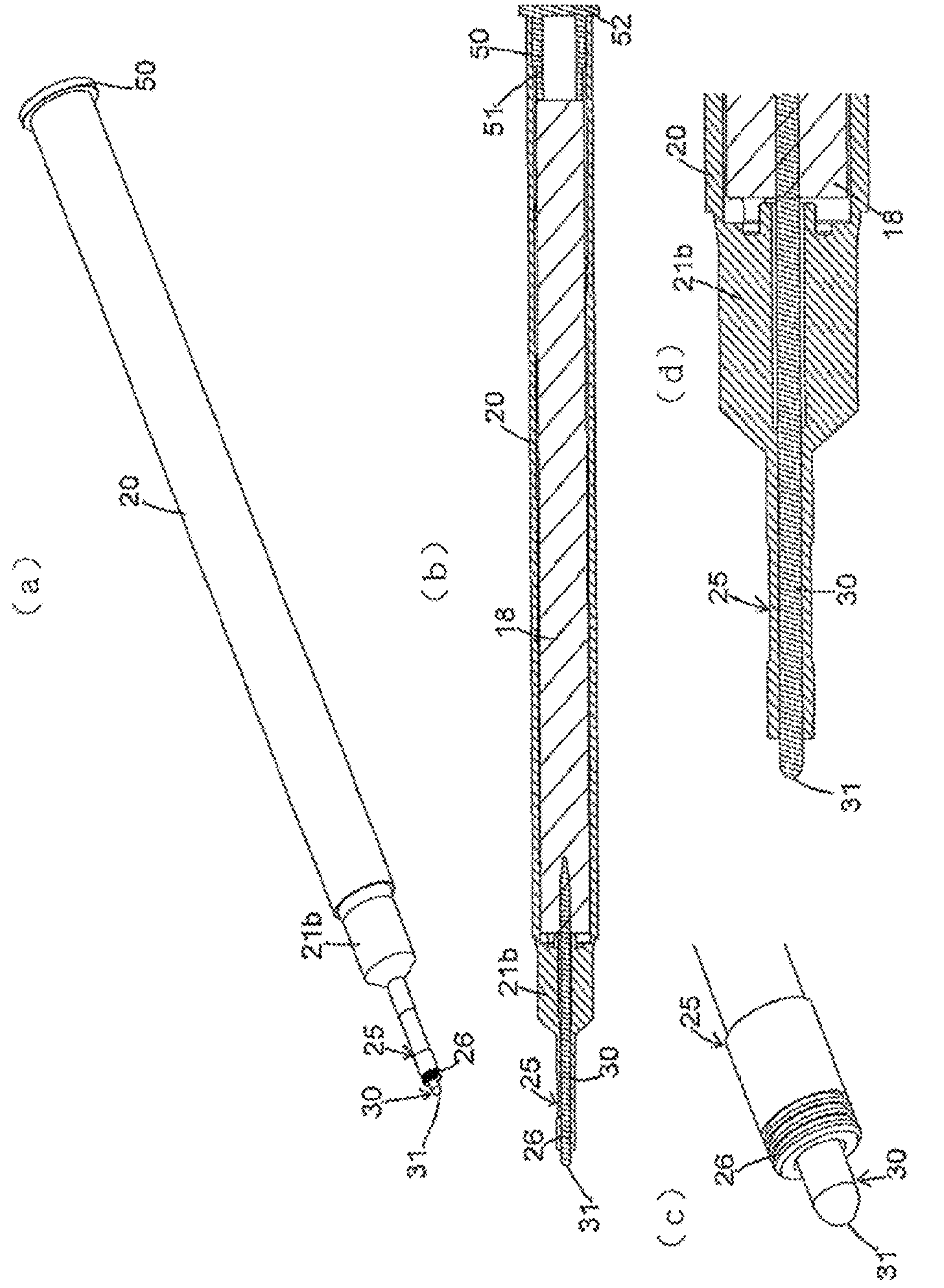
FIG. 12 is a drawing showing an example of a refill to which a pen tip used for the clicking type writing instrument of FIG. 11 is fixed, (a) a perspective view, (b) a longitudinal section in a front view, (c) an enlarged perspective view of a front end portion of the pent tip, (d) a partially enlarged longitudinal section of essential parts.
Figure 13:
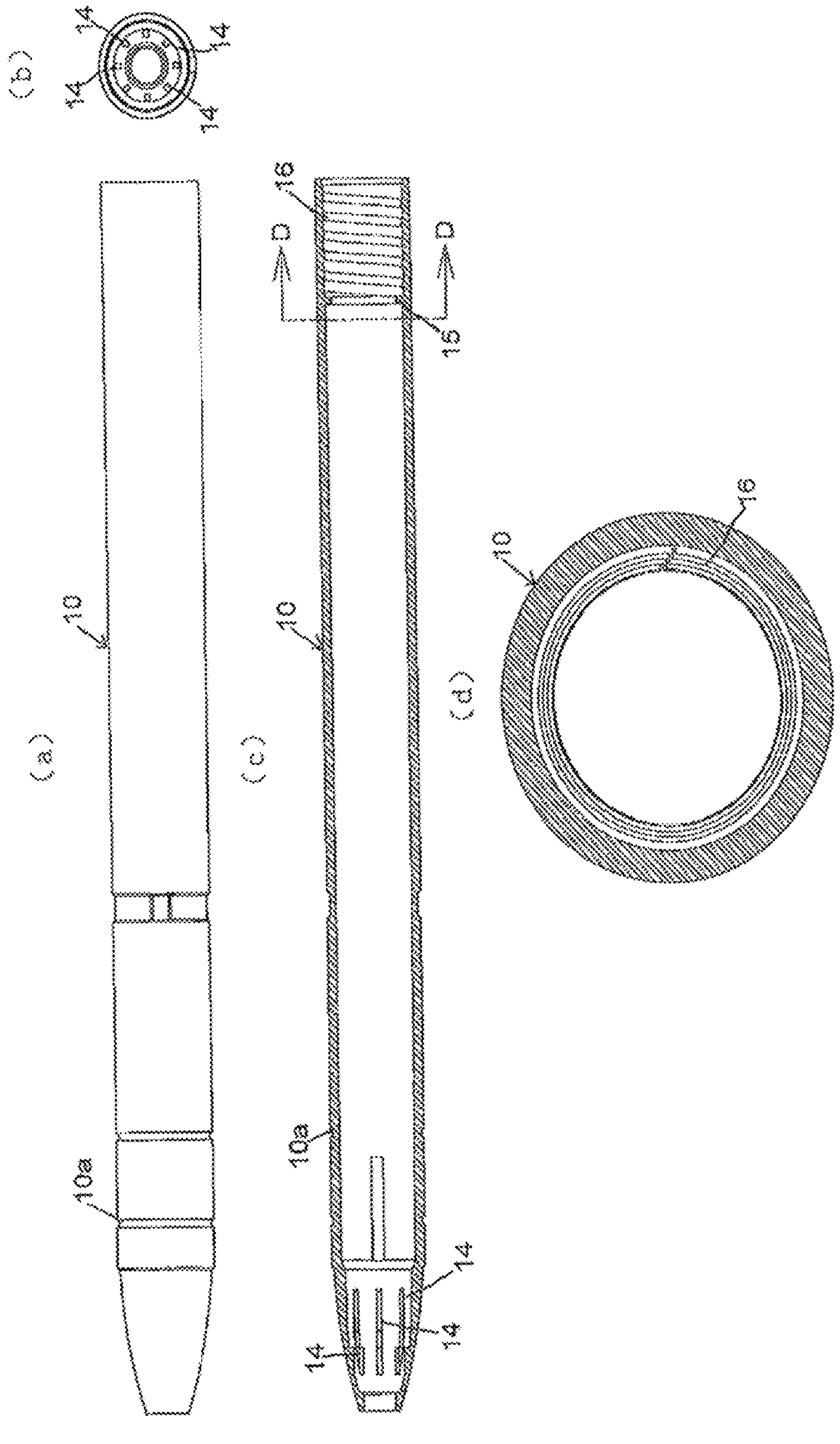
FIG. 13 is a drawing showing an example of a barrel cylinder used in the clicking type writing instrument of FIG. 11, (a) a front view, (b) a right side view, (c) a longitudinal section, and (d) an enlarged sectional view taken along line D-D in (c).

FIGS. 8 to 10 are drawings of a clicking type writing instrument B of the second embodiment, FIG. 8 shows drawings of a state before use. FIG. 9 shows drawings of a seal member used for the clicking type writing instrument. FIG. 10 shows drawings of one example of a refill to which a pen tip used for the clicking type writing instrument is fixed.

The clicking type writing instrument B of the second embodiment differs from the clicking type writing instrument A of the first embodiment in that a slip stopper 10*a* having a plurality of annular grooves disposed at regular intervals is formed around the gripping site on the outer circumference of the barrel cylinder 10; instead of the seal member 40 a seal member 45 having a configuration without any sealing piece is fixed by fitting or the like to the opening 11 of the barrel cylinder 10; the shape of the refill 20 is different; a clip 75 is formed on the outside of the inner sleeve 60; and the sealing mechanism on the rear part side is slightly different. The clicking mechanism 70 functions similarly to the clicking type writing instrument A of the first embodiment.

In this clicking type writing instrument B, as shown in FIGS. 9(*a*) to 9(*d*), the seal member 45 has a through-hole 46 in the center and a helical groove 47 similar to the helical groove formed in the anti-volatilization member 35 of the first embodiment is formed on the inner circumference of the through-hole 46. A small-diametric portion 45*a* having a small outside diameter on the front side is fitted into the opening 11 of the barrel cylinder 10 and fixed therein.

As shown in FIGS. 10(*a*) to 10(*c*), the refill 20 of this embodiment differs from the refill of the first embodiment in that it does not include the anti-volatilization member 35 of the first embodiment described above, and has a front fixing holder 21*c* having a fixing portion 21*b* for fixing the pen tip 30 on the front side.

In the clicking type writing instrument B thus configured, similarly to the clicking type writing instrument A of the first embodiment, the pen tip 30 ejects ink from the ink storage member 18 by capillary action, and the pen tip 30 can be projected out of and retracted into the front end of the barrel cylinder 10 by the clicking mechanism 70.

Since a through-hole 46 is formed in the center of a seal member 45 of this embodiment so as to allow the pen tip 30 to slide back and forth while a helical groove 47 having a helical configuration is formed on the inner circumference of the through-hole 46 of the seal member 45, volatilization of ink from the seal member 45 passes through the helical groove 47 of the helical configuration so that the route of volatilization becomes longer than a linear gape (groove) and the like thus making it possible to suppress volatilization of ink. Further, specifying the groove shape, width, length and the like of the helical groove 47 within suitable predetermined ranges, makes it possible to achieve both of suppression of ink volatilization and uniformity of internal and external pressures thanks to air circulation, in a highly compatible manner.

Thus, in the clicking type writing instrument B of the present embodiment, the helical groove 47 of the helical configuration of the seal member 45 contributes to providing a clicking type writing instrument that can reliably suppress volatilization of ink from the pen tip 30.

In addition, in this embodiment, the sealing mechanism on the rear end side of the barrel cylinder 10 works so that the contact between the abutment surface 65*a* of the rotor 65 and the front endface 63*a* of the inner sleeve portion 63 is sealed before use or when not clicked, and is released when clicked. Therefore, similarly to the first embodiment, the present embodiment is equipped with a sealing mechanism that hermetically closes air circulation between the rear portion of the barrel cylinder 10 and the outside of the writing instrument before use or when not clicked while air is circulated to the outside of the writing instrument when clicked to make internal and external pressures uniform so as to prevent ink leakage from the pen tip 30 when unclicked. Thus, volatilization of ink from the rear end of the barrel cylinder 10 is also suppressed while when a clicking operation is performed from the non-clicked state, air is taken in through the pen tip 30 and the helical groove 47 of the seal member 45, and the taken air passes through the space (clearance) between the barrel cylinder 10 and refill 20 and the clearance between the inner sleeve 63 and the rotor 65 to be discharged out of the writing instrument so that the internal and external pressures become uniform, whereby it is possible to prevent ink ejection from the pen tip 30 due to an increase of the internal pressure in the barrel cylinder 10.

FIGS. 11 to 15 are drawings showing a clicking type writing instrument, a refill to which a pen tip used for this embodiment is fixed, a barrel cylinder, and examples of non-clicked and clicked states of the third embodiment, respectively.

As shown in FIGS. 11 to 15, a clicking type writing instrument C of the third embodiment differs from the clicking type writing instrument B of the second embodiment in that a tip-mouth member 25 fixing the rear of the pen tip 30 is provided on the front side of a refill 20 while a helical groove 26 is formed on the outer peripheral surface of the tip-mouth member 25 on the front part thereof; the tip-mouth member 25 fixing the front end of the pen tip 30 is configured to slide back and forth through a through-hole 46 formed with a helical groove 47 on the inner circumference in the seal member 45; a barrel cylinder 10 has an interior wall 15 against which an abutment surface 53 of a lid member 50 fixed to the rear end side of the refill 20 abuts, and the inner circumferential surface of the interior wall 15 on the rear side is formed with a helical groove 16.

Figure 14:
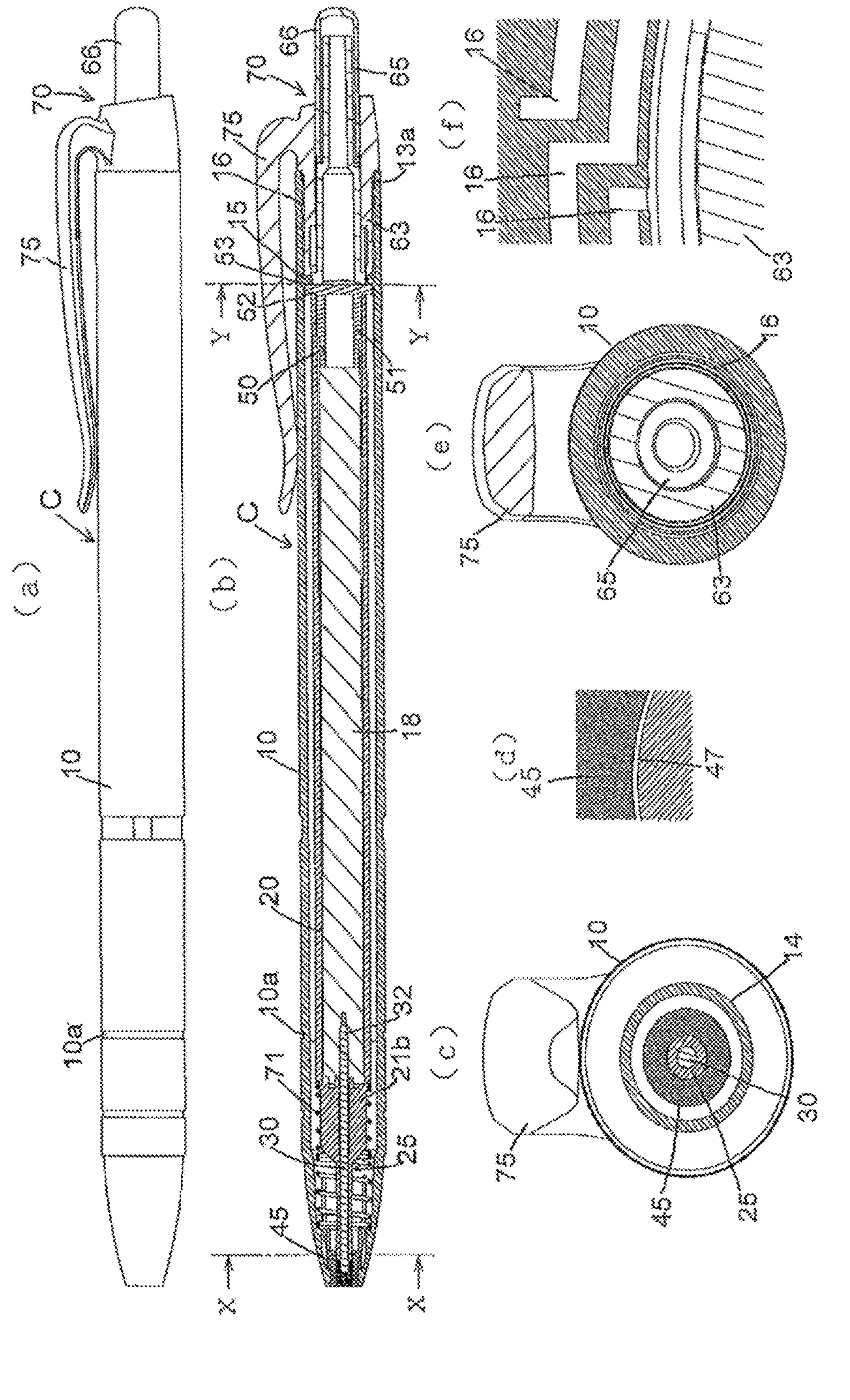
FIG. 14 is each drawing showing a non-clicked state of the clicking type writing instrument of FIG. 11, (a) a front view, (b) a longitudinal section, (c) an enlarged longitudinal sectional view taken along line X-X in (b) of (b), (d) a partially enlarged longitudinal section of (c), (e) an enlarged sectional view taken along line Y-Y in (b), and (f) a partially enlarged longitudinal section of (e).
Figure 15:
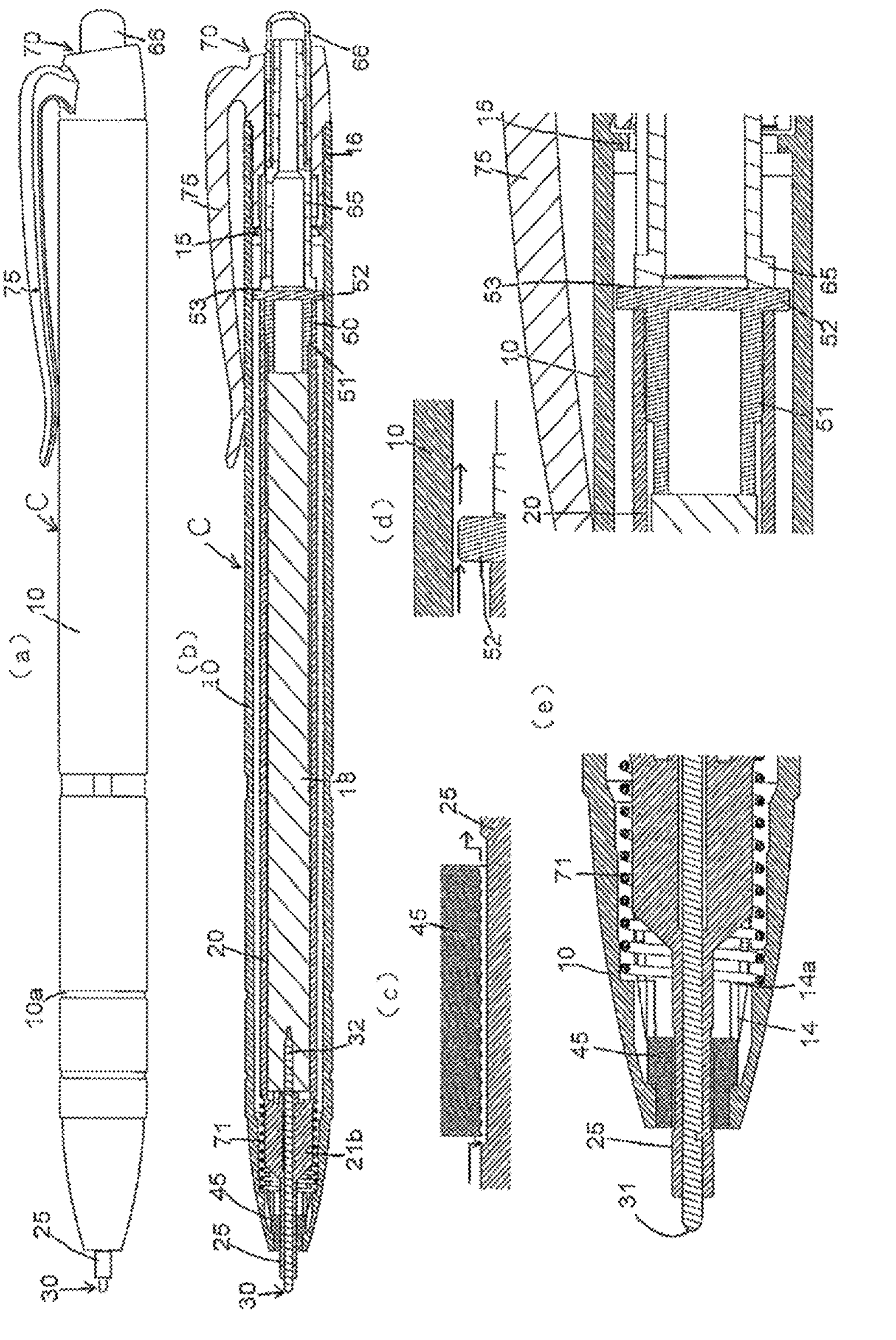
FIG. 15 is each drawing showing a clicked state of the clicking type writing instrument of FIG. 11, (a) a front view, (b) a longitudinal section, (c) a sectional view of air circulation in a seal member portion in sectional mode, (d) a sectional view of air circulation in a lid member portion in sectional mode, and (e) a partially enlarged longitudinal section shown with essential parts divided.

FIGS. 14 and 15 are illustrative diagrams for explaining non-clicked and clicked states of the clicking type writing instrument of the third embodiment. In this embodiment, as shown in FIG. 14(*b*), the sealing mechanism on the rear side of the barrel cylinder 10 works so the contact between the abutment surface 53 of the lid member 50 and the interior wall 15 of the barrel cylinder 10 is sealed before use or when not clicked, and the contact between the abutment surface 53 of the lid member 50 and the interior wall 15 of the barrel cylinder 10 is released when clicked as shown in FIG. 15(*b*).

In the clicking type writing instrument C thus configured, similarly to the clicking type writing instrument B of the second embodiment, the pen tip 30 discharges ink from the ink storage member 18 by capillary action while the pen tip 30 is configured to be projected from and retracted into the front end of the barrel cylinder 10 by means of the clicking mechanism 70.

A through-hole 46 is formed in the center of the seal member 45 of this embodiment so as to allow the pen tip 30 to slide back and forth therethrough. The through-hole 46 of the seal member 45 has a helical groove 47 of a helical configuration formed on the inner circumference of the seal member 45 while a helical groove 26 is formed on the front end side of the tip-mouth member 25, so that volatilization of ink only occurs from the exposed portion of the pen tip 30, thereby the volatilization of ink can be suppressed. Further, specifying the groove shapes, widths, lengths and the like of the helical groove 47 and the groove 26 having the helical configuration of the tip-mouth member 25 within suitable predetermined ranges, makes it possible to achieve both of suppression of ink volatilization and uniformity of internal and external pressures thanks to air circulation, in a highly compatible manner.

Thus, in the clicking type writing instrument C of the present embodiment, the helical groove 47 of a helical configuration of the seal member 45 and the helical groove 26 of the tip-mouth member 25 contribute to providing a clicking type writing instrument that can reliably suppress volatilization of ink from the pen tip 30.

In addition, in this embodiment, the sealing mechanism on the rear side of the barrel cylinder 10 works so that the contact between the abutment surface 53 of the lid member 50 and the interior wall 15 of the barrel cylinder 10 is sealed before use or when not clicked, and the contact is released when clicked. Therefore, similarly to the first and second embodiments, the present embodiment includes a sealing mechanism that hermetically closes air circulation between the rear portion of the barrel cylinder 10 and the outside of the writing instrument before use or when not clicked while air is circulated to the outside of the writing instrument when clicked to make internal and external pressures uniform so as to prevent ink leakage from the pen tip 30 when unclicked. Thus, volatilization of ink from the rear end of the barrel cylinder 10 is also suppressed while when a clicking operation is performed from the non-clicked state, as shown in FIGS. 11 to 14 and 15(*b*) to 15(*e*), air is taken in through the pen tip 30 and the helical groove 47 of the seal member 45 and the helical groove 26 of the tip-mouth member 25, and the taken air passes through the space (clearance) between the barrel cylinder 10 and refill 20 and the clearance between the barrel cylinder 10 and the rotor 65 to be discharged out of the writing instrument so that the internal and external pressures become uniform, whereby it is possible to prevent ink leakage from the pen tip 30 due to an increase of the internal pressure in the barrel cylinder 10.

FIGS. 16 to 20 are drawings of a clicking type writing instrument of a fourth embodiment, showing a state before use, a state being used for writing, an example of a refill to which a pen tip to be used is fixed, a rotor of a clicking mechanism, a state (non-clicked state) in which the pen tip is housed inside a barrel cylinder, and the like.

A clicking type writing instrument D of the fourth embodiment differs from the clicking type writing instrument B of the second embodiment in that a pen tip 30 of the refill 20 separates from an ink storage member 18 by a projecting and retracting motion; and a clicking mechanism that enables the refill 20 to project and retract by pressing is provided in the rear part of a barrel cylinder 10, the clicking mechanism is composed of a clicking body as an actuator of the clicking mechanism and a rotor form a cam mechanism, and the rotor is equipped with a valve member that is opened by the action of internal pressure on the inner surface of the barrel cylinder.

Figure 18:
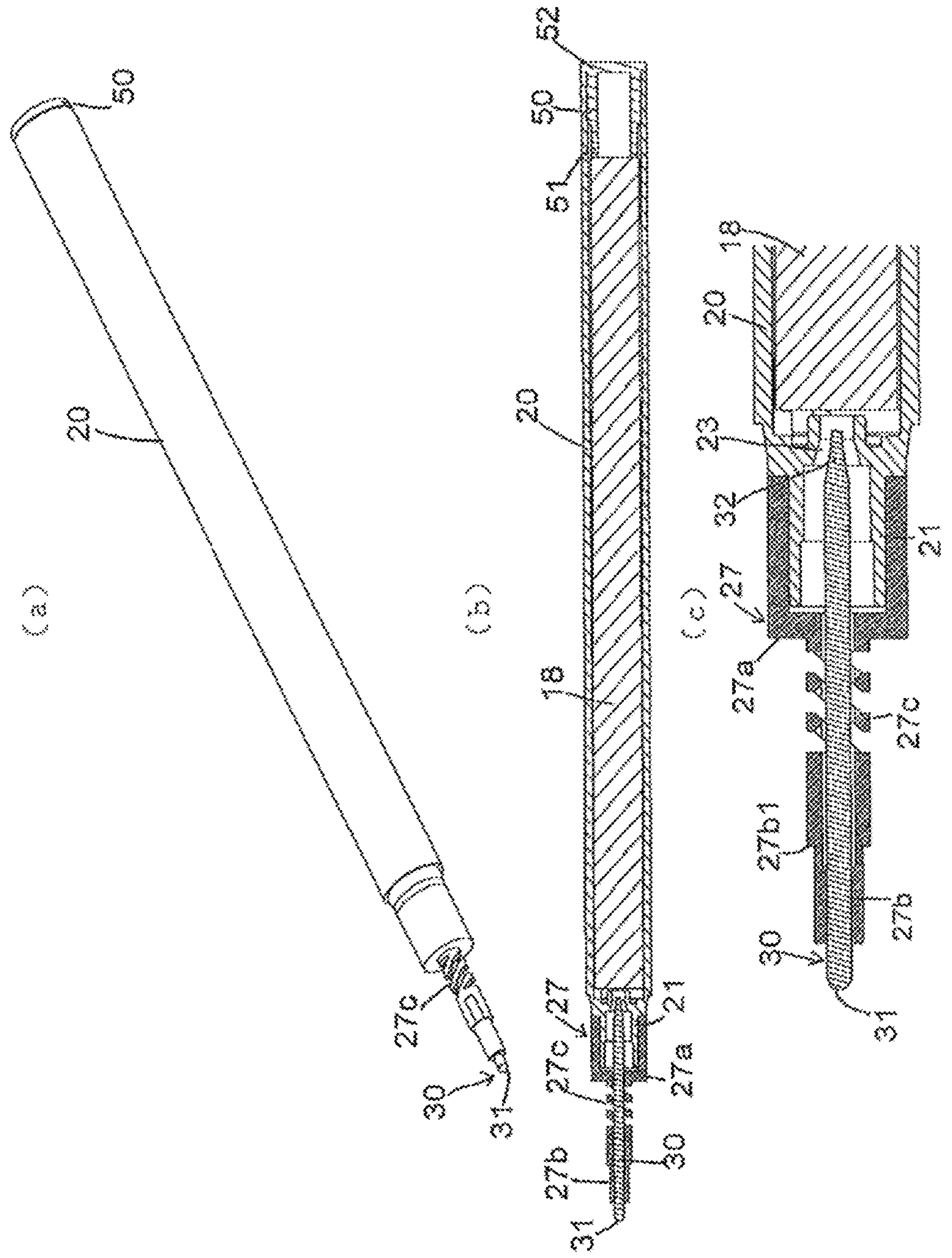
FIG. 18 is a drawing showing an example of a refill to which a pen tip used for the clicking type writing instrument of FIG. 16 is fixed, (a) a perspective view, (b) a longitudinal section in a front view, and (c) a partially enlarged longitudinal section of essential parts.

Specifically, in order to configure the clicking type writing instrument D of the fourth embodiment so as to allow the pen tip 30 of the refill 20 to be separated from the ink storage member 18 by the projecting and retracting motion, a tip fixing member 27 for fixing a pen tip 30 having a cushioning part is attached to a small-diametric tubular portion 21 of the refill 20. As shown in FIGS. 18(*a*) to 18(*c*), this tip fixing member 27 integrally includes a main body 27*a* fixed to the small-diametric tubular portion 21 of the refill 20 by fitting or the like, a fixing part 27*b* fixing the pen tip 30 at the front end thereof and a cushioning part 27*c* composed of a spring portion and disposed between the main body 27*a* and the fixing part 27*b*. Further, a seal member 48 has a through-hole 49 in the center thereof and is fixed in an opening 11 of the barrel cylinder 10 by fitting or the like.

A clicking mechanism 70, which is provided at the rear portion of the barrel cylinder 10 of this embodiment to allow the refill 20 to project and retract by pressing, is composed of a cam mechanism including a clicking body 66 serving as an actuator, a rotor 65 and the like. The rotor 65 is attached with a valve member 68 that is opened by the action of the internal pressure on the inner surface of the barrel cylinder 10.

Figure 16:
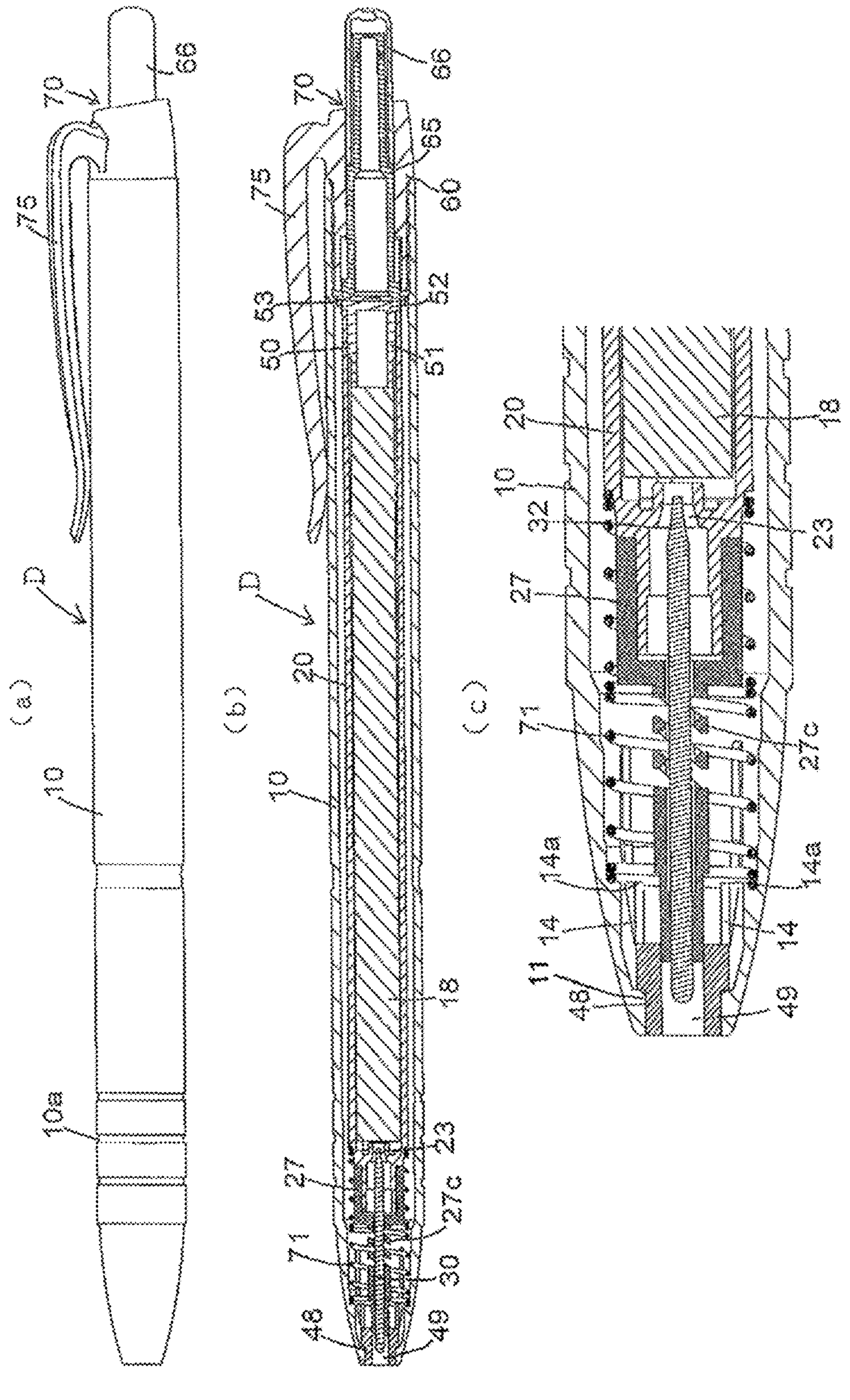
FIG. 16 is a drawing showing an unused state of a clicking type writing instrument according to a fourth embodiment of the present disclosure, (a) a front view, (b) a longitudinal section in the front view, and (c) a partially enlarged longitudinal section of a pen tip portion.
Figure 17:
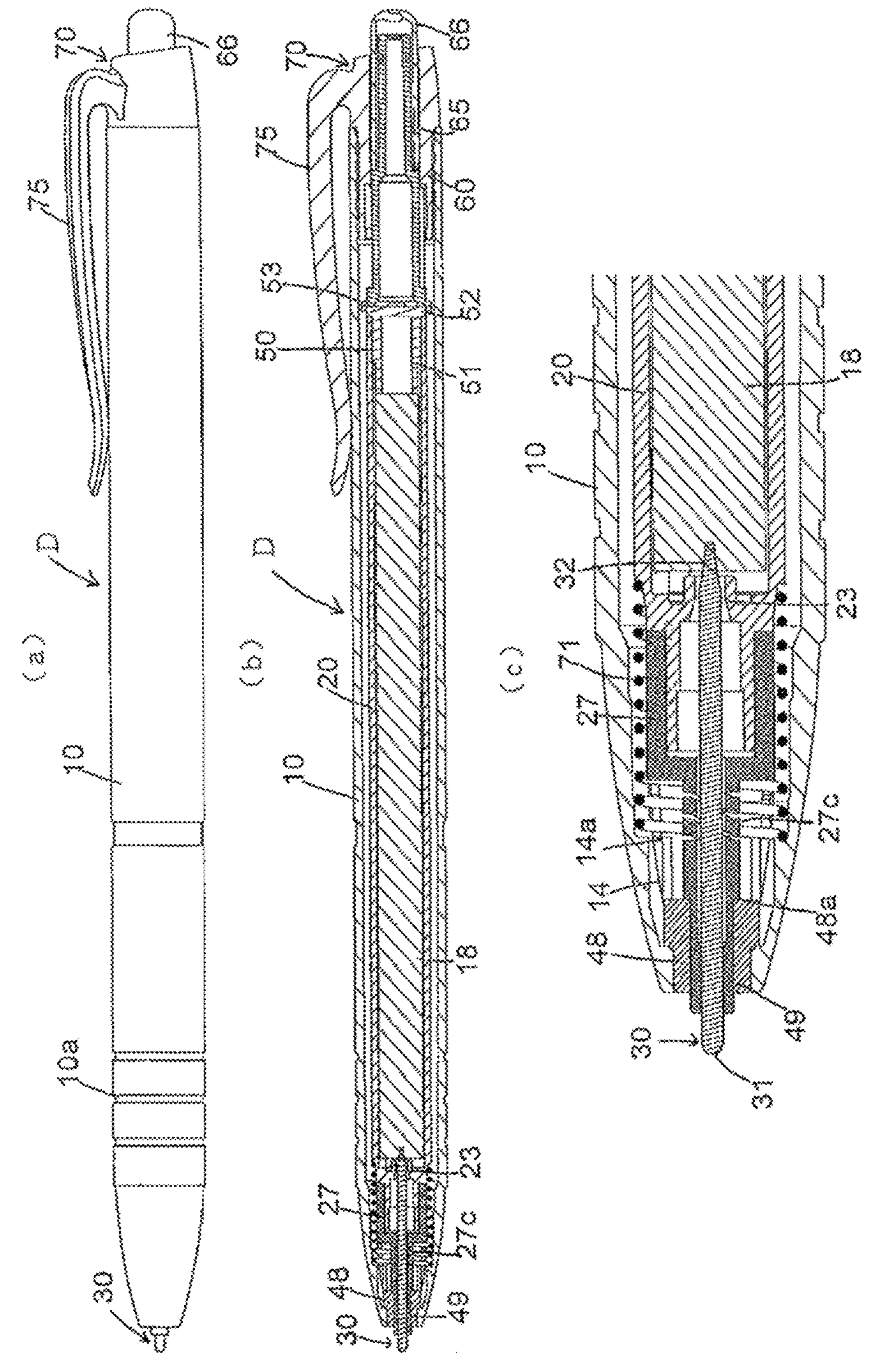
FIG. 17 is a drawing showing a state of the clicking type writing instrument in FIG. 16 in writing mode, (a) a front view, (b) a longitudinal section in the front view, and (c) a partially enlarged longitudinal section of the pen tip portion.
Figure 19:
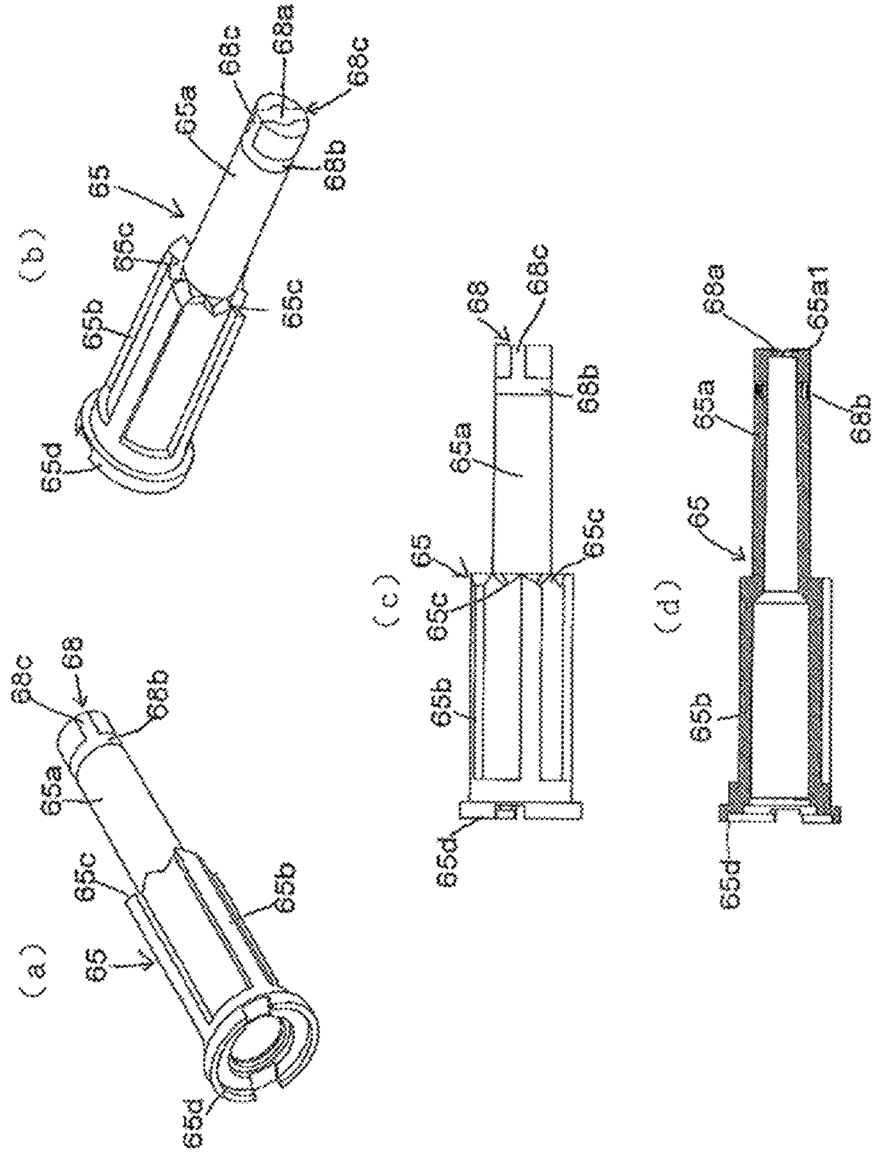
FIG. 19 is a part drawing of a rotor of a clicking mechanism of FIG. 16, (a) a perspective view seen from the front side, (b) a perspective view seen from the rear side, (c) a front view, and (d) a longitudinal section.

As shown in FIGS. 16, 17 and 19, the rotor 65 is formed of a small-diametric portion 65*a* that is inserted into the clicking body 66 serving as an actuator and is used for centering and a large-diametric portion 65*b* that is arranged in front of the small-diametric portion 65*a*. The large-diametric portion 65*b* has a greater diameter than the small-diametric portion 65*a*, and the large-diametric portion 65*b* and the small-diametric portion 65*a* form a cylindrical configuration. The large-diametric portion 65*b* has the rear endface comprising a cam mechanism formed with cam portions 65*c*, 65*c* . . . , which have complementary configurations with cam portions (not shown) of the clicking body 66 as an actuator, and the front endface formed with a concave flange portion 65*d* that comes into contact with the lid member 50.

Attached to the outer peripheral surface and the endface of the small-diametric portion 65*a* of the rotor 65 is a valve member 68, which closes an opening. As shown in FIGS. 19(*a*) to 19(*d*), the attached valve member 68 is formed of a wristwatch-shaped valve element 68*a*, a ring-shaped portion 68*b* located distant from the valve element 68*a*, and a continuous portion 68*c* longitudinally connecting the valve element 68*a* and the ring-shaped portion 68*b*, forming an integrated elastic body. In a state where the valve element 68 is attached to the rotor 65, the rear end opening of the small-diametric portion 65*a* is closed by the valve element 68*a* while the ring portion 68*b* is fitted in the circumferential groove of the small-diametric portion 65*a* and the continuous portion 68*c* is fitted in the longitudinal groove, producing a hermetic state. This valve member 68 can be molded using, for example, the aforementioned synthetic rubbers, thermoplastic elastomers and the like. Also, the rotor 65 including the valve member 68 can be integrally molded by two-color molding. This embodiment uses a two-color molding molded of polyacetal for the rotor 65 and styrene-based elastomer for the valve member 68.

The clicking mechanism in this embodiment is implemented by pressing forward the clicking body 66 as an actuator to move the rotor 65 forward to a predetermined position inside the inner sleeve 60, together with the clicking body 66.

FIG. 16 shows a state of the clicking type writing instrument according to the fourth embodiment before use, in which the front end of the tip fixing member 27 that is attached on the front end side of the refill 20 and fixes the pen tip 30, is inserted in the through-hole 49 of the seal member 48 while the rear end of the pen tip 30 is kept away (separated) from the ink storage member 18, so that ink will not be supplied hence no ink will volatilize from the pen tip 30. From this state, when the clicking body 66 serving as an actuator is pressed forward by a clicking operation, the rotor 65 moves forward to a predetermined position as shown in FIGS. 17 and 18. At this time, the tip fixing member 27 moves forward, but is restrained from advancing by a stepped portion 27*b*1 of the fixing part 27*b* which comes contact with the outer peripheral surface 48*a* on the rear end of the seal member 48. At the same time, the cushioning part 27*c* formed of a spring reduces in diameter (shrinks) by the elastic force thereof and the rear end 32 of the pen tip 30 is inserted into the ink storage member 18 while the pen tip 30 comes out from the exit of the through-hole 49 of the seal member 48, whereby ink is supplied from the ink storage member 18 to the writing part 31 of the pen tip 30 by capillary force, creating a writing state. Thereafter, when a non-writing state is to be restored, a clicking operation (an action of pressing the clicking body 66) releases the cam's locking state by the cam mechanism of the rotor 65, etc., so that the rotor 65 rotates. Thereafter, when the applied force is released, the urging force of the elastic member 71 moves the rotor 65 further rearward, so that the clicking type writing instrument D recovers its non-writing state as shown in FIG. 16.

In this embodiment, upon writing, the rear end 32 of the pen tip 30 is inserted into the ink storage member 18 so that ink is supplied to the writing part 31 of the pen tip 30. On the other hand, upon non-writing, since the rear end of the pen tip 30 is kept away (separated) from the ink supply member 18, volatilization of the ink from the ink storage member 18 is reliably suppressed in combination with the seal member 48. Also, even if the internal pressure in the barrel cylinder 10 increases, the rear end of the pen tip 30 is kept away (separated) from the ink supply member 18, so ink will not leak out.

Next, with reference to FIG. 20, a further detailed description on the clicking type writing instrument D of the present embodiment will be given by referring to a case where the internal pressure in the barrel cylinder 10 increases and a case of air induction at the time of clicking.

Figure 20:
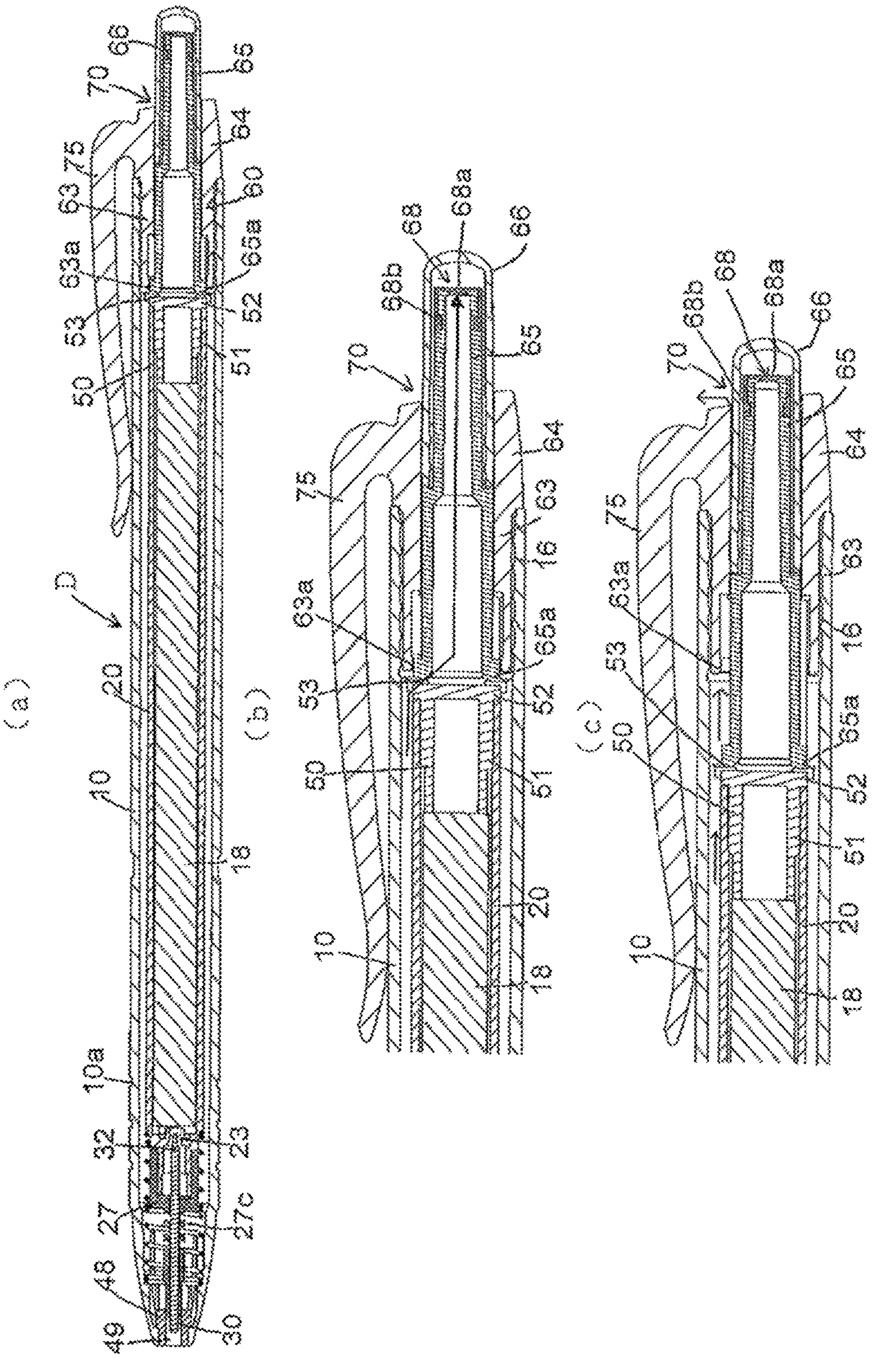
FIG. 20 is a drawing showing, (a) a longitudinal section showing a state (non-clicked state) in which the pen tip of the clicking type writing instrument of FIG. 16 is accommodated in the barrel cylinder, (b) a partial longitudinal section showing essential parts on the rear end side when the internal pressure inside the barrel cylinder rises in the non-clicked state, and (c) a partial longitudinal section showing essential parts on the rear end side in the clicked state.

FIG. 20(*a*) is a longitudinal section showing a state (non-clicked state) in which the pen tip of the clicking type writing instrument of FIG. 16 is housed in the barrel cylinder, FIG. 20(*b*) is a partial longitudinal section showing essential parts on the rear end side when the internal pressure of the barrel cylinder increases in the non-clicked state. FIG. 2 *c*) is a partial longitudinal section showing essential parts on the rear end side in the clicked state.

In the non-clicked state of the clicking type writing instrument D of the present embodiment, when the internal pressure of the barrel cylinder 10 has increased due to fluctuations in the outside air temperature, air passes through the inside of the rotor 65 and reaches the interior surface of the valve element 68*a* of the valve member 68, as shown in FIGS. 19 and 20(*b*). As a result, the continuous portion 68*c* of the valve member 68 is elastically deformed and stretched by the air pressure, so that the valve element 68*a* is pushed up from the opening to release the valve so as to create a gap, whereby the air coming out of the rotor 65 is discharged out of the writing instrument D through a gap between the outer sleeve portion 64 and the clicking body 66.

Further, when a clicking operation is performed on the clicking type writing instrument D of the present embodiment, the refill 20 moves forward, and the contact between the abutment surface 65*a* of the rotor 65 and the front endface 63*a* of the inner sleeve portion 63 is released as shown in FIG. 20(*c*), so that the air outside the writing instrument enters through the gap between the clicking body 66 and the inner sleeve 60 and is taken into the barrel cylinder 10, whereby the internal and external pressures are kept uniform.

The clicking type writing instrument D of this embodiment has a mechanism for taking in air at the rear end side of the barrel cylinder 10 and purging air when the internal pressure of the barrel cylinder 10 increases, thus making it possible to implement the operation efficiently with a simple structure.

The clicking type writing instrument of the present disclosure is not limited to the above-described embodiments and the like, and various changes can be made without departing from the technical spirit of the present disclosure.

The configuration of the clicking type writing instrument D of the above embodiment in which the valve member 68 is attached to the rotor 65 may be applied to the rotors 65 of the writing instruments A to C of the first to third embodiments so as to purge air from the rear end side when the internal pressure in the barrel cylinder 10 has increased.

Furthermore, in each of the clicking type writing instruments A to D of the above embodiments, the pen tip 30 was described as being a rod-shaped, but may be shaped like a bullet.

Though in the above-described embodiments, ink for writing instruments (water-based inks, oil-based inks, and thermochromic inks) has been described, a liquid medium such as a liquid cosmetic, a liquid medicine, an application liquid, a correcting fluid may be used.

EXAMPLES

Next, the present disclosure will be described in further detail by giving examples, however the present disclosure is not limited to the following examples.

Example 1

A clicking type writing instrument having the following configurations and a pen tip conforming to FIGS. 1 to 7 was used with an ink for writing instruments having the following composition. The dimensions of the pen tip and the writing implement, etc., are specified as shown below.

(Writing Instrument Configuration)

- Barrel cylinder 10: made of polypropylene, 127 mm long with an inside diameter of 9 mm in the center and an outside diameter of 11 mm; Ink storage member: PET fiber bundle of ¢6×80 mm with a porosity of 85%;
- Refill 20: made of polypropylene, 97 mm long with an inside diameter of 6 mm in the center;
- Pen tip 30: made of polyacetal of 01.0×30 mm
- Anti-volatilization member 35: made of polyacetal with a helical groove having a U-shaped section with a width of 0.3 mm, with 8 turns of the helical groove;
- Seal member 40: molded of thermoplastic elastomer, by using two-color molding with barrel cylinder 10;
- Clearance X: 0.05 mm with a stroke T of 6 mm;
- Lid member 50, Inner sleeve 60, Rotor 65, and Clicking body 66, all made of polypropylene; and
- Elastic member 71: made of stainless steel.

(Ink Composition for Writing Instruments, Ink Color: Black)

An ink for writing instruments having the following composition (100% by mass in total) was used.

- Activator: MEGAFACE F410 (fluorine-based anionic surfactant, carboxylate with perfluoroalkyl groups, manufactured by DIC Corporation) 1% by mass;
- Antifungal agent: benzisothiazolin-3-one 0.2% by mass;
- Glyceryl glycoside aqueous solution: α GG (high-concentration α-glyceryl glycoside aqueous solution, α-glyceryl glycoside 60% aqueous solution, manufactured by JTS Co., Ltd.) 3% by mass;
- Pigment water dispersion: FUJI SP BLACK 8041 (black pigment water dispersion with a solid content of 20%, manufactured by Fuji Pigment Co., Ltd.) 20% by mass;
- Water-soluble organic solvent: glycerin 5% by mass;
- Water-soluble organic solvent: ethylene glycol 5% by mass;
- Water (solvent): ion-exchanged water 65.8% by mass;
- Viscosity (25° C.): 3.6 mpa·s
  (complete type viscometer, manufactured by TOKIMEC, Co., Ltd; TV-20); and
- Surface tension (25° C.): 40 mN/m (automatic surface tension meter, manufactured by Kyowa Interface Science Co., Ltd., DY-300).

In the clicking type writing instrument A equipped with the ink for writing instruments composed as described above, when the initial clicking operation (first clicking operation) was performed in the state shown in FIGS. 1 and 2 after production, the pen tip 30 broke through the sealing piece 43 of the seal member 40 and came out. Though the sealing piece 43 was connected to the seal member 40 in such a way that it seemed likely to come off, it was confirmed that the sealing piece could be easily removed by picking it up with fingers.

It was confirmed that the sealing piece 43 of the seal member 40 can be easily removed when the pen tip 30 is pressed (in a writing state by a clicking operation) and/or by being torn off with fingers or the like, thus a writing state could be achieved by the removal (see FIG. 6).

It was also confirmed by a sensory evaluation that ink volatilization from the rear end portion of the barrel cylinder 10 did not occur thanks to the sealing mechanism provided on the rear end side of the barrel cylinder 10.

INDUSTRIAL APPLICABILITY

According to the present disclosure, it is at least possible to obtain a clicking type writing instrument that can reliably suppress volatilization of ink from the pen tip before the start of use.

DESCRIPTION OF REFERENCE NUMERALS

10 barrel cylinder
18 ink storage member
20 refill
30 pen tip
35 anti-volatilization member
40 seal member
43 sealing piece
50 lid member

60 inner sleeve
65 rotor
66 clicking body
70 clicking mechanism

The invention claimed is:

1. A clicking type writing instrument comprising:

a refill provided in a barrel cylinder;

a pen tip configured to discharge ink from an ink storage member accommodated in the refill by capillary action and to be allowed to be projected from and retracted into a front end of the barrel cylinder by means of a clicking mechanism provided in the barrel cylinder; and at least a seal member, arranged around an outer periphery of the pen tip near a front end side of the pen tip, and formed with a through-hole in a center of the seal member, through which the pen tip can slidably move back and forth when the pen tip is housed inside the barrel cylinder, wherein the seal member has a sealing piece that can be removed by pressing the pen tip, arranged in front of a front end of the pen tip.

2. The clicking type writing instrument according to claim 1, further comprising a sealing mechanism that seals a circulation of air between a rear portion of the barrel cylinder and an outside of the writing instrument before use or when not clicked and allows air to flow to the outside of the writing instrument when clicked so as to keep internal and external pressures uniform to prevent ejection of ink from the pen tip when not clicked.

3. The clicking type writing instrument according to claim 2, wherein an anti-volatilization member that surrounds the outer peripheral of the pen tip is formed with a helical groove in a rear of the seal member.

4. The clicking type writing instrument according to claim 3, wherein a helical groove is formed on an inner surface of the seal member.

5. The clicking type writing instrument according to claim 4, wherein a tip-mouth member is provided in a rear of the pen tip of the refill, and a helical groove is formed on an outer peripheral surface of the tip-mouth member.

6. The clicking type writing instrument according to claim 5, wherein the barrel cylinder is formed with an interior wall against which a rear endface of the refill is abutted, and a groove is formed on a surface of the interior wall.

7. The clicking type writing instrument according to claim 6, wherein the pen tip of the refill is separated from the ink storage member by a projecting and retracting movement.

8. The clicking type writing instrument according to claim 7, further comprising a clicking mechanism arranged on the rear portion of the barrel cylinder, the clicking mechanism allowing the refill to be projected and retracted by a pressing operation, wherein the clicking mechanism is comprised of a cam mechanism comprising an actuator and a rotor, and the rotor is equipped with a valve portion that is opened by an inner pressure acting on an inner surface of the barrel cylinder.

* * * * *